(12) United States Patent
Sinclair

(10) Patent No.: US 8,209,516 B2
(45) Date of Patent: Jun. 26, 2012

(54) METHOD AND SYSTEM FOR DUAL MODE ACCESS FOR STORAGE DEVICES

(75) Inventor: Alan W. Sinclair, Falkirk (GB)

(73) Assignee: Sandisk Technologies Inc., Plano, TX (US)

( * ) Notice: Subject to any disclaimer, the term of this patent is extended or adjusted under 35 U.S.C. 154(b) by 129 days.

(21) Appl. No.: 12/714,237

(22) Filed: Feb. 26, 2010

(65) Prior Publication Data

US 2010/0223308 A1 Sep. 2, 2010

Related U.S. Application Data

(62) Division of application No. 11/313,567, filed on Dec. 21, 2005, now Pat. No. 7,747,837.

(51) Int. Cl.
*G06F 12/00* (2006.01)
(52) U.S. Cl. .......... 711/203; 711/102; 711/E12.001; 707/831; 707/E17.01
(58) Field of Classification Search ............. 711/102, 711/203, E12.001; 707/831, E17.01
See application file for complete search history.

(56) References Cited

U.S. PATENT DOCUMENTS

| | | |
|---|---|---|
| 4,761,737 A | 8/1988 | Duvall et al. |
| 4,800,520 A | 1/1989 | Iijima |
| 4,802,117 A | 1/1989 | Chrosny et al. |
| 4,896,262 A | 1/1990 | Wayama et al. |
| 5,226,155 A | 7/1993 | Iijima |
| 5,369,754 A | 11/1994 | Fandrick et al. |
| 5,388,083 A | 2/1995 | Assar et al. |
| 5,404,485 A | 4/1995 | Ban |
| 5,530,673 A | 6/1996 | Tobita et al. |
| 5,542,066 A | 7/1996 | Mattson et al. |
| 5,544,356 A | 8/1996 | Robinson et al. |
| 5,570,315 A | 10/1996 | Tanaka et al. |
| 5,586,291 A | 12/1996 | Lasker et al. |
| 5,592,662 A | 1/1997 | Sawada et al. |
| 5,592,669 A | 1/1997 | Robinson et al. |
| 5,602,987 A | 2/1997 | Harari et al. |
| 5,619,690 A | 4/1997 | Matsumani et al. |

(Continued)

FOREIGN PATENT DOCUMENTS

CN 1466060 A 1/2004

(Continued)

OTHER PUBLICATIONS

Interview Summary for U.S. Appl. No. 11/314,842 (Feb. 23, 2010).

(Continued)

*Primary Examiner* — Yong Choe
(74) *Attorney, Agent, or Firm* — Jenkins, Wilson, Taylor & Hunt, P.A.

(57) ABSTRACT

A method and system for reading data from a non-volatile mass storage device is provided. The method includes, performing logical configuration for the non-volatile mass storage device, wherein file data is allocated addresses in a virtual logical address space; and data identified by virtual logical addresses is read by a host system. The system includes a file storage segment that reads and writes data on a file-by-file basis, allowing a host system to access data from the non-volatile mass storage device using a file interface format; and a logical interface segment that allows the host system to access data using logical addressing, wherein the host system is unaware of a storage format under which data is stored on a file-by-file basis.

14 Claims, 17 Drawing Sheets

U.S. PATENT DOCUMENTS

| | | |
|---|---|---|
| 5,628,014 A | 5/1997 | Cecchini et al. |
| 5,634,050 A | 5/1997 | Krueger et al. |
| 5,636,355 A | 6/1997 | Ramakrishnan et al. |
| 5,708,846 A | 1/1998 | Ryan |
| 5,754,888 A | 5/1998 | Yang et al. |
| 5,774,397 A | 6/1998 | Endoh et al. |
| 5,778,418 A | 7/1998 | Auclair et al. |
| 5,798,968 A | 8/1998 | Lee et al. |
| 5,799,168 A | 8/1998 | Ban |
| 5,809,558 A | 9/1998 | Matthews et al. |
| 5,832,493 A | 11/1998 | Marshall et al. |
| 5,848,420 A | 12/1998 | Xu |
| 5,867,641 A | 2/1999 | Jenett |
| 5,890,192 A | 3/1999 | Lee et al. |
| 5,896,393 A | 4/1999 | Yard et al. |
| 5,907,854 A | 5/1999 | Kerns |
| 5,928,347 A | 7/1999 | Jones |
| 5,933,846 A | 8/1999 | Endo |
| 5,937,425 A | 8/1999 | Ban |
| 5,953,538 A | 9/1999 | Duncan et al. |
| 5,966,720 A | 10/1999 | Itoh et al. |
| 5,973,964 A | 10/1999 | Tobita et al. |
| 5,978,893 A | 11/1999 | Bakshi et al. |
| 5,987,478 A | 11/1999 | See et al. |
| 5,996,047 A | 11/1999 | Peacock |
| 6,014,724 A | 1/2000 | Jenett |
| 6,016,530 A | 1/2000 | Auclair et al. |
| 6,021,415 A | 2/2000 | Cannon et al. |
| 6,038,636 A | 3/2000 | Brown, III et al. |
| 6,046,935 A | 4/2000 | Takeuchi et al. |
| 6,069,827 A | 5/2000 | Sinclair |
| 6,078,520 A | 6/2000 | Tobita et al. |
| 6,094,693 A | 7/2000 | Haneda |
| 6,145,069 A | 11/2000 | Dye |
| 6,148,354 A | 11/2000 | Ban et al. |
| 6,216,204 B1 | 4/2001 | Thiriet |
| 6,223,271 B1 | 4/2001 | Cepulis |
| 6,226,728 B1 | 5/2001 | See et al. |
| 6,256,690 B1 | 7/2001 | Carper |
| 6,275,436 B1 | 8/2001 | Tobita et al. |
| 6,275,804 B1 | 8/2001 | Carl et al. |
| 6,279,069 B1 | 8/2001 | Robinson et al. |
| 6,286,056 B1 | 9/2001 | Edgar et al. |
| 6,286,256 B1 | 9/2001 | Weder |
| 6,370,614 B1 | 4/2002 | Teoman et al. |
| 6,373,746 B1 | 4/2002 | Takeuchi et al. |
| 6,380,597 B1 | 4/2002 | Gudesen et al. |
| 6,385,690 B1 | 5/2002 | Iida et al. |
| 6,389,433 B1 | 5/2002 | Bolosky et al. |
| 6,408,357 B1 | 6/2002 | Hanmann et al. |
| 6,412,040 B2 | 6/2002 | Hasbun et al. |
| 6,421,279 B1 | 7/2002 | Tobita et al. |
| 6,424,486 B2 | 7/2002 | Heaton et al. |
| 6,426,893 B1 | 7/2002 | Conley et al. |
| 6,427,186 B1 | 7/2002 | Lin et al. |
| 6,446,140 B1 | 9/2002 | Nozu |
| 6,456,528 B1 | 9/2002 | Chen |
| 6,466,973 B2 | 10/2002 | Jaffe |
| 6,467,015 B1 | 10/2002 | Nolan et al. |
| 6,467,021 B1 | 10/2002 | Sinclair |
| 6,467,022 B1 | 10/2002 | Buckland et al. |
| 6,477,616 B1 | 11/2002 | Takahashi |
| 6,480,935 B1 | 11/2002 | Carper et al. |
| 6,484,937 B1 | 11/2002 | Devaux et al. |
| 6,490,649 B2 | 12/2002 | Sinclair |
| 6,493,811 B1 | 12/2002 | Blades et al. |
| 6,504,846 B1 | 1/2003 | Yu et al. |
| 6,522,580 B2 | 2/2003 | Chen et al. |
| 6,535,949 B1 | 3/2003 | Parker |
| 6,542,407 B1 | 4/2003 | Chen et al. |
| 6,547,150 B1 | 4/2003 | Deo et al. |
| 6,567,307 B1 | 5/2003 | Estakhri |
| 6,598,114 B2 | 7/2003 | Funakoshi |
| 6,604,168 B2 | 8/2003 | Ogawa |
| 6,631,453 B1 | 10/2003 | Friday |
| 6,631,456 B2 | 10/2003 | Leighnor et al. |
| 6,643,188 B2 | 11/2003 | Tanaka et al. |
| 6,646,948 B1 | 11/2003 | Stence et al. |
| 6,667,932 B2 | 12/2003 | Roohparvar et al. |
| 6,668,336 B2 | 12/2003 | Lasser |
| 6,681,239 B1 | 1/2004 | Munroe et al. |
| 6,728,851 B1 | 4/2004 | Estakhri et al. |
| 6,748,457 B2 | 6/2004 | Fallon et al. |
| 6,763,424 B2 | 7/2004 | Conley |
| 6,766,432 B2 | 7/2004 | Saltz |
| 6,771,536 B2 | 8/2004 | Li et al. |
| 6,772,955 B2 | 8/2004 | Yoshimoto et al. |
| 6,779,063 B2 | 8/2004 | Yamamoto |
| 6,781,877 B2 | 8/2004 | Cernea et al. |
| 6,798,710 B2 | 9/2004 | Roohparvar et al. |
| 6,804,730 B1 | 10/2004 | Kawashima |
| 6,810,462 B2 | 10/2004 | Matsunami et al. |
| 6,823,417 B2 | 11/2004 | Spencer |
| 6,834,331 B1 | 12/2004 | Liu |
| 6,839,823 B1 | 1/2005 | See et al. |
| 6,842,843 B1 | 1/2005 | Vishlitzky et al. |
| 6,845,385 B1 | 1/2005 | Hennessey |
| 6,865,659 B2 | 3/2005 | Montemayor |
| 6,877,074 B2 | 4/2005 | Naitoh et al. |
| 6,883,114 B2 | 4/2005 | Lasser |
| 6,886,083 B2 | 4/2005 | Murakami |
| 6,895,464 B2 | 5/2005 | Chow et al. |
| 6,898,662 B2 | 5/2005 | Gorobets |
| 6,925,007 B2 | 8/2005 | Harari et al. |
| 6,938,116 B2 | 8/2005 | Kim et al. |
| 6,965,963 B1 | 11/2005 | Nakanishi et al. |
| 7,003,553 B2 | 2/2006 | Kanai et al. |
| 7,032,065 B2 | 4/2006 | Gonzalez et al. |
| 7,035,949 B2 | 4/2006 | Bychkov et al. |
| 7,092,911 B2 | 8/2006 | Yokota et al. |
| 7,127,549 B2 | 10/2006 | Sinclair |
| 7,136,973 B2 | 11/2006 | Sinclair |
| 7,193,899 B2 | 3/2007 | Eggleston et al. |
| 7,251,747 B1 | 7/2007 | Bean et al. |
| 7,627,733 B2 | 12/2009 | Sinclair |
| 7,747,837 B2 | 6/2010 | Gorobets et al. |
| 7,769,978 B2 | 8/2010 | Gorobets et al. |
| 7,793,068 B2 | 9/2010 | Sinclair et al. |
| 7,877,539 B2 | 1/2011 | Sinclair et al. |
| 2001/0034809 A1 | 10/2001 | Ogawa |
| 2001/0052038 A1 | 12/2001 | Fallon et al. |
| 2002/0069354 A1 | 6/2002 | Fallon et al. |
| 2002/0078002 A1 | 6/2002 | Bottomley et al. |
| 2002/0083280 A1 | 6/2002 | Naitoh et al. |
| 2002/0099904 A1 | 7/2002 | Conley |
| 2002/0166023 A1 | 11/2002 | Nolan et al. |
| 2002/0178143 A1 | 11/2002 | Fujimoto |
| 2002/0184436 A1 | 12/2002 | Kim et al. |
| 2002/0188592 A1 | 12/2002 | Leonhardt et al. |
| 2003/0002432 A1 | 1/2003 | Morris et al. |
| 2003/0026186 A1 | 2/2003 | Ando et al. |
| 2003/0065866 A1 | 4/2003 | Spencer |
| 2003/0065876 A1 | 4/2003 | Lasser |
| 2003/0065899 A1 | 4/2003 | Gorobets |
| 2003/0088812 A1 | 5/2003 | Lasser |
| 2003/0109093 A1 | 6/2003 | Harari et al. |
| 2003/0128619 A1 | 7/2003 | Roohparvar et al. |
| 2003/0135514 A1 | 7/2003 | Patel et al. |
| 2003/0147278 A1 | 8/2003 | Tanaka et al. |
| 2003/0208501 A1 | 11/2003 | Walter et al. |
| 2003/0229753 A1 | 12/2003 | Hwang |
| 2003/0229769 A1 | 12/2003 | Montemayor |
| 2004/0019716 A1 | 1/2004 | Bychkov et al. |
| 2004/0019761 A1 | 1/2004 | Fukuzumi |
| 2004/0024921 A1 | 2/2004 | Peake, Jr. et al. |
| 2004/0028068 A1 | 2/2004 | Kizhepat |
| 2004/0030693 A1 | 2/2004 | Toda |
| 2004/0040018 A1 | 2/2004 | Fleming et al. |
| 2004/0044873 A1 | 3/2004 | Wong et al. |
| 2004/0073627 A1 | 4/2004 | Amano |
| 2004/0073727 A1 | 4/2004 | Moran et al. |
| 2004/0103241 A1 | 5/2004 | Chang et al. |
| 2004/0123020 A1 | 6/2004 | Gonzalez et al. |
| 2004/0133718 A1 | 7/2004 | Kodama et al. |
| 2004/0157638 A1 | 8/2004 | Moran et al. |
| 2004/0186946 A1 | 9/2004 | Lee |
| 2004/0205289 A1 | 10/2004 | Srinivasan |

| | | | |
|---|---|---|---|
| 2004/0205301 A1 | 10/2004 | Hara et al. | |
| 2004/0207512 A1 | 10/2004 | Bastian, II | |
| 2004/0248612 A1 | 12/2004 | Lee | |
| 2005/0018527 A1 | 1/2005 | Gorobets | |
| 2005/0021657 A1 | 1/2005 | Negishi et al. | |
| 2005/0055497 A1 | 3/2005 | Estakhri et al. | |
| 2005/0086241 A1* | 4/2005 | Ram et al. | 707/100 |
| 2005/0086422 A1 | 4/2005 | Wong et al. | |
| 2005/0125600 A1 | 6/2005 | Ehrlich | |
| 2005/0125602 A1 | 6/2005 | Ehrlich | |
| 2005/0125603 A1 | 6/2005 | Ehrlich | |
| 2005/0141312 A1 | 6/2005 | Sinclair et al. | |
| 2005/0141313 A1 | 6/2005 | Gorobets et al. | |
| 2005/0144357 A1 | 6/2005 | Sinclair | |
| 2005/0144358 A1 | 6/2005 | Conley et al. | |
| 2005/0144360 A1 | 6/2005 | Bennett et al. | |
| 2005/0144363 A1 | 6/2005 | Sinclair | |
| 2005/0144365 A1 | 6/2005 | Gorobets et al. | |
| 2005/0144367 A1 | 6/2005 | Sinclair | |
| 2005/0166087 A1 | 7/2005 | Gorobets | |
| 2005/0172067 A1 | 8/2005 | Sinclair | |
| 2005/0172074 A1 | 8/2005 | Sinclair | |
| 2005/0223166 A1 | 10/2005 | Kanai et al. | |
| 2006/0004951 A1 | 1/2006 | Rudelic et al. | |
| 2006/0020744 A1 | 1/2006 | Sinclair et al. | |
| 2006/0020745 A1 | 1/2006 | Conley et al. | |
| 2006/0031593 A1 | 2/2006 | Sinclair | |
| 2006/0087957 A1 | 4/2006 | Kelly et al. | |
| 2006/0143365 A1 | 6/2006 | Kikuchi | |
| 2006/0155920 A1 | 7/2006 | Smith et al. | |
| 2006/0155921 A1 | 7/2006 | Gorobets et al. | |
| 2006/0155922 A1 | 7/2006 | Gorobets et al. | |
| 2006/0161724 A1 | 7/2006 | Bennett et al. | |
| 2006/0161728 A1 | 7/2006 | Bennett et al. | |
| 2006/0168392 A1 | 7/2006 | Hwang | |
| 2006/0168395 A1 | 7/2006 | Deng et al. | |
| 2006/0184718 A1 | 8/2006 | Sinclair et al. | |
| 2006/0184719 A1 | 8/2006 | Sinclair | |
| 2006/0184720 A1 | 8/2006 | Sinclair et al. | |
| 2006/0184722 A1 | 8/2006 | Sinclair | |
| 2006/0184723 A1 | 8/2006 | Sinclair et al. | |
| 2007/0014136 A1 | 1/2007 | Ali et al. | |
| 2007/0030734 A1 | 2/2007 | Sinclair et al. | |
| 2007/0033323 A1 | 2/2007 | Gorobets | |
| 2007/0033324 A1 | 2/2007 | Sinclair | |
| 2007/0033326 A1 | 2/2007 | Sinclair | |
| 2007/0033328 A1 | 2/2007 | Sinclair et al. | |
| 2007/0033329 A1 | 2/2007 | Sinclair et al. | |
| 2007/0033330 A1 | 2/2007 | Sinclair et al. | |
| 2007/0033332 A1 | 2/2007 | Sinclair | |
| 2007/0033362 A1 | 2/2007 | Sinclair | |
| 2007/0033373 A1 | 2/2007 | Sinclair | |
| 2007/0033374 A1 | 2/2007 | Sinclair et al. | |
| 2007/0143532 A1 | 6/2007 | Gorobets et al. | |
| 2007/0143570 A1 | 6/2007 | Gorobets et al. | |
| 2007/0143571 A1 | 6/2007 | Sinclair et al. | |

FOREIGN PATENT DOCUMENTS

| | | |
|---|---|---|
| DE | 102 34 971 A1 | 2/2004 |
| EP | 0 564 699 A1 | 10/1993 |
| EP | 0 702 305 | 3/1996 |
| EP | 1 054 319 A2 | 11/2000 |
| EP | 0 852 765 | 9/2001 |
| EP | 1 100 001 | 8/2003 |
| EP | 1 357 463 A2 | 10/2003 |
| EP | 1 571 557 | 9/2005 |
| JP | 62-283496 | 12/1987 |
| JP | 11-161527 | 6/1999 |
| JP | 2002/251310 | 9/2002 |
| JP | 2005 122439 | 5/2005 |
| TW | 1234070 | 6/2005 |
| TW | 1327274 | 7/2010 |
| TW | I350968 | 10/2011 |
| TW | I352901 | 11/2011 |
| WO | WO 97/50035 | 12/1997 |
| WO | WO 00/49488 | 8/2000 |
| WO | WO 02/19334 A2 | 3/2002 |
| WO | WO 02/23341 A1 | 3/2002 |
| WO | WO 02/29575 A2 | 4/2002 |
| WO | WO 02/058074 A2 | 7/2002 |
| WO | WO 2004/012027 A2 | 2/2004 |
| WO | WO 2004/040453 A2 | 5/2004 |
| WO | WO 2004/040455 A2 | 5/2004 |
| WO | WO 2004/046937 | 6/2004 |
| WO | WO-2005/066793 A2 | 7/2005 |
| WO | WO 2005/081097 A2 | 9/2005 |
| WO | WO 2006/088719 A2 | 8/2006 |
| WO | WO-2006/088723 A2 | 8/2006 |
| WO | WO 2006/088727 A2 | 8/2006 |
| WO | WO 2007/019075 A2 | 2/2007 |
| WO | WO 2007/076378 A2 | 7/2007 |
| WO | WO 2007/079358 A2 | 7/2007 |

OTHER PUBLICATIONS

Notice of Non-Compliant Appeal Brief for U.S. Appl. No. 11/060,249 (Feb. 22, 2010).
Notice of Allowance for U.S. Appl. No. 11/313,567 (Feb. 12, 2010).
Final Official Action for U.S. Appl. No. 11/342,168 (Nov. 19, 2010).
Advisory Action for U.S. Appl. No. 11/060,248 (Nov. 10, 2009).
Interview Summary for U.S. Appl. No. 11/313,633 (Nov. 5, 2009).
Interview Summary for U.S. Appl. No. 11/313,567 (Nov. 5, 2009).
Official Action for U.S. Appl. No. 11/314,842 (Oct. 26, 2009).
Official Action for Taiwanese Patent Application No. 095128233 (Aug. 11, 2009).
China State Intellectual Property Office, "First Office Action," corresponding Chinese Patent Application No. 2006800089822.0, mailed on Aug. 5, 2009, 7 pages.
China State Intellectual Property Office, "First Office Action," corresponding Chinese Patent Application No. 200680009222.3, mailed on Jul. 22, 2009, 7 pages.
Official Action for U.S. Appl. No. 11/313,633 (Jul. 17, 2009).
Notice of Allowance and Fee(s) Due for U.S. Appl. No. 11/196,168 (Jul. 16, 2009).
Official Action for U.S. Appl. No. 11/313,567 (Jun. 15, 2009).
Official Action for U.S. Appl. No. 11/342,170 (May 20, 2009).
Official Action for U.S. Appl. No. 11/314,842 (May 8, 2009).
Interview Summary for U.S. Appl. No. 11/060,249 (May 8, 2009).
Final Official Action for U.S. Appl. No. 11/060,248 (Apr. 28, 2009).
Final Official Action for U.S. Appl. No. 11/060,174 (Apr. 28, 2009).
China State Intellectual Property Office, "Office Action," corresponding Chinese Patent Application No. 200680089894, mailed on Apr. 24, 2009, 25 pages (including translation).
Final Official Action for U.S. Appl. No. 11/060,249 (Apr. 8, 2009).
Communication pursuant to Article 94(3) EPC for European Application No. 06788725.7 (Mar. 10, 2009).
Official Action for U.S. Appl. No. 11/342,168 (Mar. 4, 2009).
Interview Summary for U.S. Appl. No. 11/313,567 (Feb. 2, 2009).
Noting of loss of rights pursuant to Rule 112(1) EPC for European Application No. 06734695.7 (Jan. 21, 2009).
Noting of loss of rights pursuant to Rule 112(1) EPC for European Application No. 067720547.6 (Jan. 20, 2009).
Official Action for U.S. Appl. No. 11/313,633 (Jan. 6, 2009).
Official Action for U.S. Appl. No. 11/313,567 (Jan. 6, 2009).
Official Action for U.S. Appl. No. 11/196,168 (Dec. 24, 2008).
Official Action for U.S. Appl. No. 11/342,170 (Oct. 17, 2009).
Official Action for U.S. Appl. No. 11/314,842 (Sep. 15, 2008).
Official Action for U.S. Appl. No. 11/342,168 (Aug. 19, 2008).
Official Action for U.S. Appl. No. 11/060,248 (Aug. 14, 2008).
Official Action for U.S. Appl. No. 11/060,249 (Aug. 4, 2008).
Official Action for U.S. Appl. No. 11/060,174 (Jul. 24, 2008).
Final Official Action for U.S. Appl. No. 11/196,168 (Jul. 24, 2008).
Notification Concerning Transmittal of International Preliminary Report on Patentability for International Application No. PCT/US2006/062341 (Jul. 3, 2008).
Notification Concerning the Transmittal of International Preliminary Report on Patentability for International Application No. PCT/US2006/062340 (Jul. 3, 2008).
Communication pursuant to Article 94(3) EPC corresponding to European Patent Application No. 06734659.3 (Jun. 23, 2008).
Final Official Action for U.S. Appl. No. 11/313,567 (May 28, 2008).
Communication pursuant to Article 94(3) EPC for European Application No. 06734695.7 (May 19, 2008).

Communication pursuant to Article 94(3) EPC for European Application No. 06720547.6 (May 19, 2008).
Final Official Action for U.S. Appl. No. 11/313,633 (Apr. 29, 2008).
Final Official Action for U.S. Appl. No. 11/314,842 (Apr. 1, 2008).
Notification Concerning Transmittal of International Preliminary Report on Patentability for International Application No. PCT/US2006/029306 (Feb. 14, 2008).
Interview Summary for U.S. Appl. No. 11/314,842 (Jan. 16, 2008).
Interview Summary for U.S. Appl. No. 11/313,567 (Jan. 16, 2008).
Final Official Action for U.S. Appl. No. 11/060,249 (Dec. 26, 2007).
Official Action for U.S. Appl. No. 11/342,168 (Dec. 26, 2007).
Final Official Action for U.S. Appl. No. 11/060,248 (Dec. 26, 2007).
Official Action for U.S. Appl. No. 11/342,170 (Dec. 14, 2007).
Final Official Action for U.S. Appl. No. 11/060,174 (Dec. 12, 2007).
Official Action for U.S. Appl. No. 11/196,168 (Nov. 28, 2007).
Notification of Transmittal of the International Search Report and the Written Opinion of the International Searching Authority, or the Declaration for International Application No. PCT/US2006/062340 (Oct. 29, 2007).
Official Action for U.S. Appl. No. 11/313,567 (Oct. 9, 2007).
Official Action for U.S. Appl. No. 11/313,633 (Oct. 9, 2007).
Official Action for U.S. Appl. No. 11/314,842 (Oct. 9, 2007).
International Preliminary Report on Patentability for International Application No. PCT/US2006/004658 (Aug. 21, 2007).
International Preliminary Report on Patentability for International Application No. PCT/US2006/004585 (Aug. 21, 2007).
International Preliminary Report on Patentability for International Application No. PCT/US2006/004555 (Aug. 21, 2007).
Notification of Transmittal of the International Search Report and the Written Opinion of the International Searching Authority, or the Declaration for International Application No. PCT/US2006/062341 (Jun. 26, 2007).
Official Action for U.S. Appl. No. 11/060,249 (Apr. 13, 2007).
Official Action for U.S. Appl. No. 11/060,248 (Apr. 5, 2007).
Official Action for U.S. Appl. No. 11/060,174 (Mar. 27, 2007).
Notification of Transmittal of the International Search Report and the Written Opinion of the International Searching Authority, or the Declaration for International Application No. PCT/US2006/029306 (Mar. 9, 2007).
Notification of Transmittal of the International Search Report and the Written Opinion of the International Searching Authority, or the Declaration for International Application No. PCT/US2006/004555 (Oct. 4, 2006).
International Search Report for International Application No. PCT/US2006/004658 (Aug. 23, 2006).
Notification of Transmittal of the International Search Report and the Written Opinion of the InternationalSearching Authority, or the Declaration for International Application No. PCT/US2006/004585 (Aug. 17, 2006).
Written Opinion of the International Searching Authority for International Application No. PCT/US2005/000275 (Aug. 7, 2006).
Lim et al., "An Efficient NAND Flash File System for Flash Memory Storage," IEEE Transactions on Computer, vol. 55, No. 7, pp. 906-912 (Jul. 1, 2006).
Notice of Allowance and Fee(s) due for U.S. Appl. No. 10/772,855 (Jun. 16, 2006).
Notice of Allowance and Fee(s) due for U.S. Appl. No. 10/772,789 (Jun. 16, 2006).
Official Action for U.S. Appl. No. 10/772,789, (Mar. 24, 2006).
Notice of Allowance and Fee(s) due for U.S. Appl. No. 10/772,855 (Feb. 21, 2006).
Co-pending U.S. Patent Application entitled "Method and System for Accessing Non-Volatile Storage Devices," U.S. Appl. No. 11/313,633, filed Dec. 22, 2005.
Co-pending U.S. Patent Application entitled "Dual Mode Access for Non-Volatile Storage Devices," U.S. Appl. No. 11/314,842, filed Dec. 21, 2005.
Co-pending U.S. Patent Application entitled "Method and System for Accessing Non-Volatile Storage Devices," U.S. Appl. No. 11/313,567, filed Dec. 21, 2005. (co-pending to U.S. Appl. No. 11/196,168=1694/43).

Gal et al. "Algorithms and Data Structures for Flash Memories," ACM Computing Surveys (CSUR) vol. 37, Issue 2, pp. 138-163, (Jun. 2005).
Co-pending U.S. Patent Application entitled Direct File Data Programming and Deletion in Flash Memories,) U.S. Appl. No. 11/060,174, filed Feb. 16, 2005. (co-pending to U.S. Appl. No. 11/342,170).
Co-pending U.S. Provisional Patent Application entitled "Direct Data File Storage in Flash Memories," U.S. Appl. No. 60/705,388, filed Aug. 3, 2004. (co-pending to U.S. Appl. No. 11/060,249).
Rankl, Wolfgang, "Smart Card Handbook," Third Edition, Translated by Kenneth Cox, John Wiley & Sons, Ltd., pp. 52-93, 233-369, & 435-490, (2004).
Imamiya et al., "A 125-mm2 1-Gb NAND Flash Memory with 10-Mbyte/s Program Speed," IEEE Journal of Solid-State Circuits, vol. 37, No. 11, pp. 1493-1501, (Nov. 2002).
Kim et al., "A Space-Efficient Flash Translation Layer for CompactFlash Systems," IEEE Transactions on Consumer Electronics, vol. 48, No. 2, pp. 366-375, (May 2002).
Lai/The Waite Group, "Writing MS-DOS® Device Drivers," Second Edition, pp. 240-253 (2002).
Microsoft Computer Dictionary, Microsoft Press, 2002, Fifth Edition, p. 151.
Ban, Amir, "Local Flash Disks: Two Architectures Compared," M-Systems Flash Disks Pioneers, White Paper, Rev. 1.0, pp. 1-8, (Aug. 2001).
Kim, et al., "A New Flash Memory Management for Flash Storage System," Computer Software and Applications Conference, 1999. Compsac '99 Proceedings. IEEE Comput. Soc., pp. 284-289 (1999).
Chiang et al., "Cleaning Policies in Mobile Computers Using Flash Memory," Journal of Systems & Software, vol. 48, pp. 213-231, (1999).
"Intel AP-686 Application Note, Flash File System Selection Guide," 18 pgs. (Dec. 1998).
"ISO/IEC, International Standard, Information Technology—Identification Cards—Integrated Circuit(s) With Contracts," Part 4: Interindustry Commands for Interchange, ISO/IEC 7816-4, First Edition, 46 pgs. (Sep. 1, 1995).
Eshel et al., "Multiple Caching Schemes in a Lan-Attached Server," IP.Com Journal, IP.Com Inc., West Henrietta, NY, US. (Apr. 1, 1995).
Kjelso et al., "Memory Management in Flash-Memory Disks with Data Compression," Springer-Verlag, pp. 399-413 (1995).
Wu et al., "Envy: A Non-Volatile, Main Memory Storage System," ACM Sigplan Notices, vol. 29, No. 11, pp. 86-97, (Nov. 1, 1994).
Hitz, D. et al., "File System Design for an NFS File Server Appliance," Network Appliance Technical Report 3002 Retrieved from http://citeseer.ist.psu.edu/hitz95file.html (Jan. 19, 1994).
Ban, Amir, "Inside Flash File Systems—Part II," IC Card Systems & Design, pp. 21-24, (Sep./Oct. 1993).
Ban, Amir, "Inside Flash File Systems—Part I," IC Card Systems & Design, pp. 15-16, & 18, (Jul. Aug. 1993).
Kolowsky, "Introduction to MTP: Media Transfer Protocol," Cypress Semiconductor (Publication Date Unknown).
Chiang et al., "Data Management in a Flash Memory Based Storage Server," National Chiao-Tung University, Hsinchu, Taiwan, Dept. of Computer and Information Science, 8 pages, (Publication Date Unknown).
PNY Technologies Attache Flash Product, http://www.pny.com/products/flash/attache.asp (Copyright 2003).
Notice of Allowance for Taiwanese Patent Application No. 095148077 (Jun. 22, 2011).
Notice of Allowance and Fee(s) Due for U.S. Appl. No. 11/314,842 (Apr. 29, 2010).
Taiwanese Office Action for Taiwanese Patent Application No. 095148079 (Apr. 23, 2010).
Decision to Grant for Taiwanese Application No. 095128233 (Mar. 22, 2010).
Notice of Allowance and Fee(s) Due for U.S. Appl. No. 11/313,633 (Mar. 22, 2010).
Final Official Action for U.S. Appl. No. 11/342,170 (Mar. 4, 2010).
Official Action for Taiwanese Application No. 095148077 (Feb. 8, 2010).

Taiwanese Allowance Decision for Taiwanese application No. 095148079 (Nov. 28, 2010).
Notice of Allowance and Fee(s) Due for U.S. Appl. No. 11/060,249 (Sep. 21, 2010).
Taiwanese Office Action for Taiwanese Patent Application No. 09514877 (Sep. 10, 2010).
Notice of Abandonment for U.S. Appl. No. 11/060,174 (Jul. 2, 2010).
Interview Summary for U.S. Appl. No. 11/196,826 (Nov. 30, 2011).
First Office Action for Japanese Patent Application No. 2008-525047 (Nov. 8, 2011).
First Office Action for Japanese Patent Application No. 2008-525046 (Nov. 8, 2011).

* cited by examiner

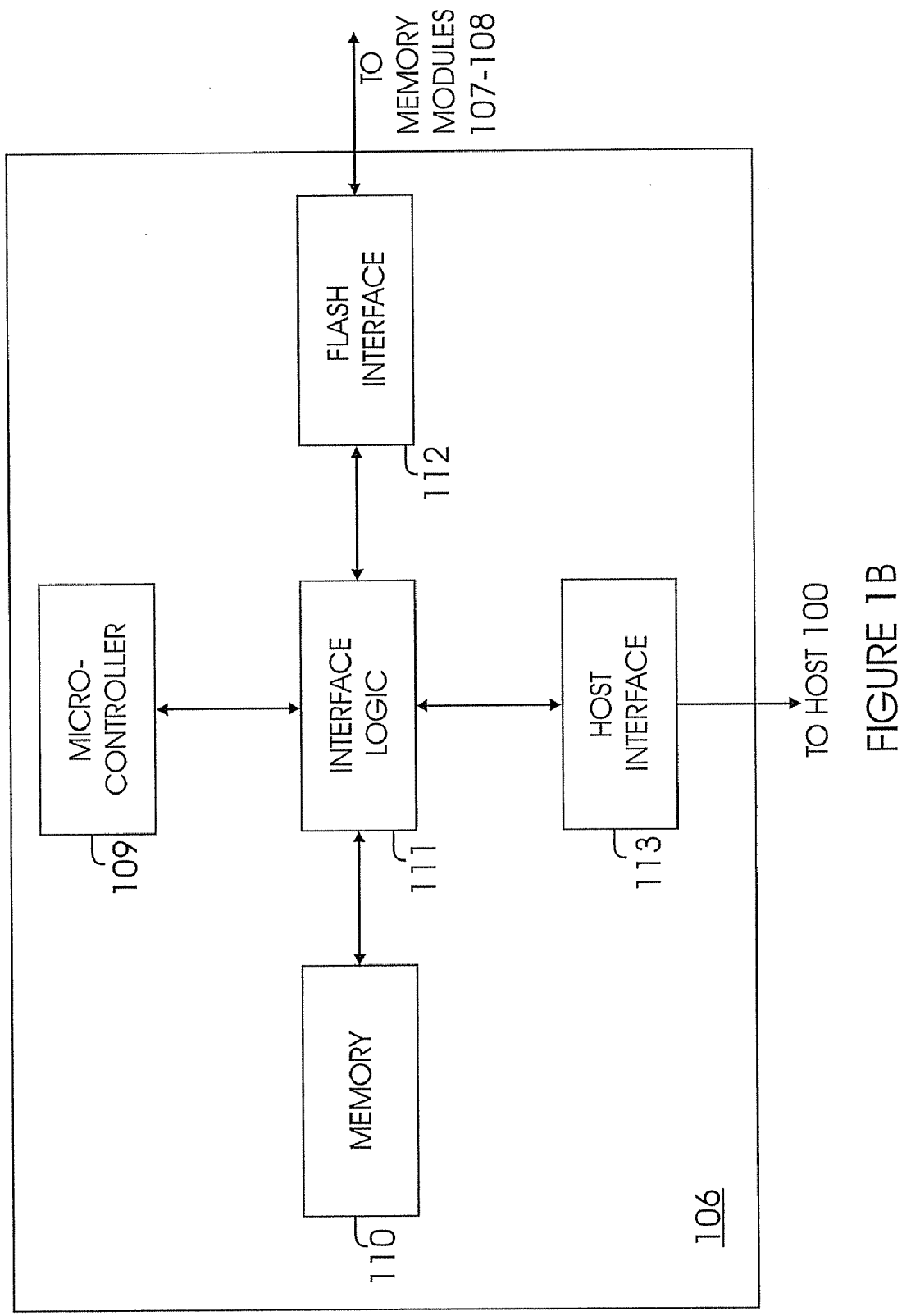

DIRECT FILE STORAGE SYSTEM

PRIOR ART SYSTEM

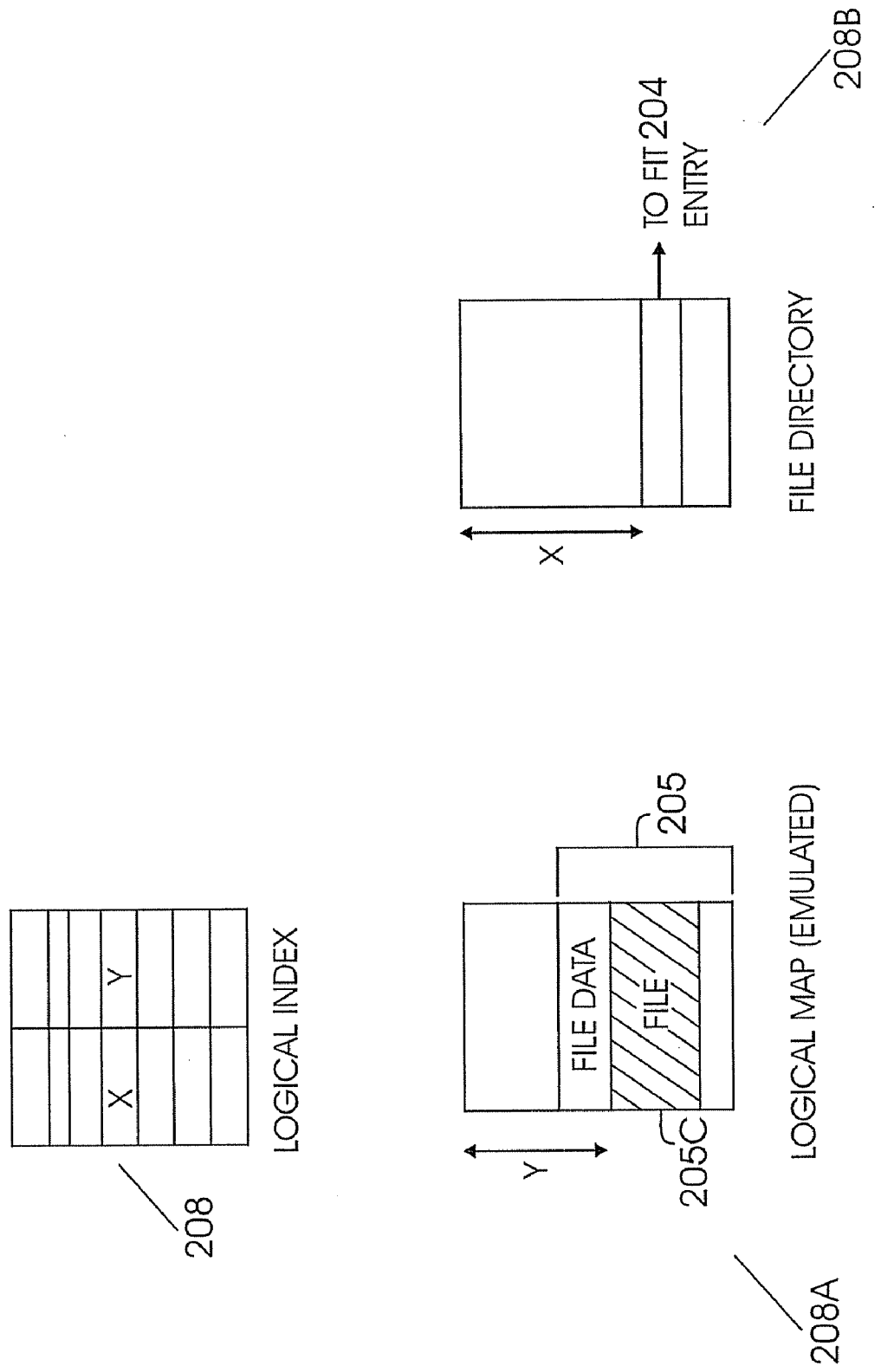

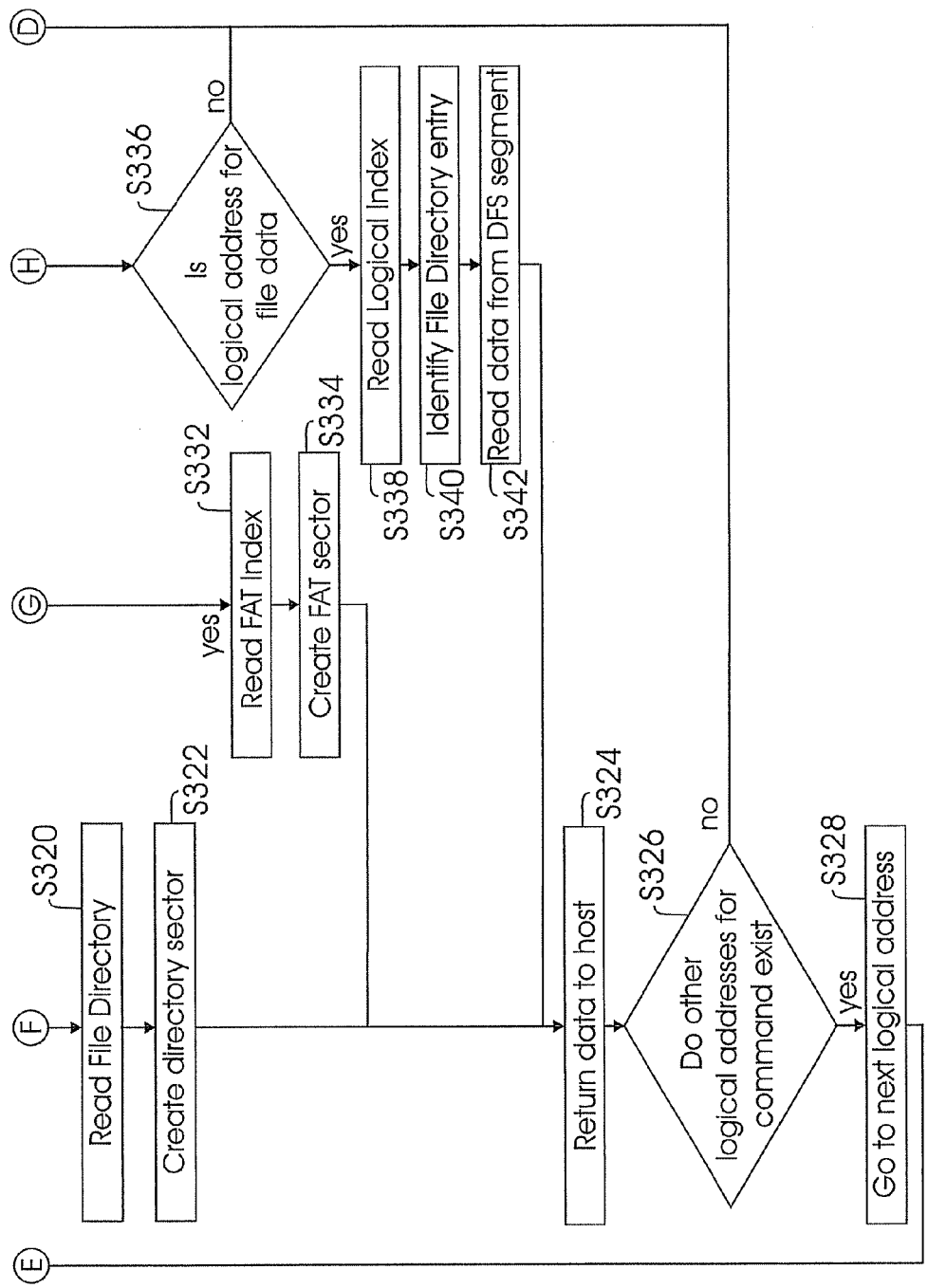
FIGURE 3(iii)

METHOD AND SYSTEM FOR DUAL MODE ACCESS FOR STORAGE DEVICES

PRIORITY CLAIM

This application is a divisional patent application of U.S. patent application Ser. No. 11/313,567, filed Dec. 21, 2005 now U.S. Pat. No. 7,747,837, the disclosure of which is incorporated herein by reference in its entirety.

RELATED APPLICATIONS

This patent application is related to the following co-pending patent applications, incorporated herein by reference in their entireties:
Ser. No. 11/060,249; Filed on Feb. 16, 2005;
Ser. No. 11/060,174; Filed on Feb. 16, 2005;
Ser. No. 11/060,248; Filed on Feb. 16, 2005;
Ser. No. 11/196,168; Filed on Aug. 3, 2005, (now U.S. Pat. No. 7,627,733); and
Provisional patent application Ser. No. 60/705,388; filed Aug. 3, 2004.

BACKGROUND

1. Field of the Invention

The present invention relates generally to the operation of re-programmable non-volatile memory systems such as semiconductor flash memory, and more particularly, to the management of the interface between a host device and the memory.

2. Background

Conventional computer systems typically include several functional components. These components may include a central processing unit (CPU), main memory, input/output ("I/O") devices, and mass storage devices. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

A host system interfaces with mass storage devices for example, non-volatile memory systems (may also be referred to as "flash device", "flash" or "flash card" interchangeably throughout this specification) via an interface.

In an early generation of commercial flash memory systems, a rectangular array of memory cells were divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

Flash memory systems are most commonly provided in the form of a memory card or flash drive that is removably connected with a variety of hosts such as a personal computer, a camera or the like, but may also be embedded within such host systems.

Typically, a host system maintains a file directory and allocates file data to logical clusters. A host system that uses a logical interface for accessing data may be referred to as a legacy host system. The term host system in this context includes legacy flash memory card readers and digital cameras and the like.

In conventional systems, a host maintains a file system and allocates file data to logical clusters, where the cluster size is typically fixed. A flash device is divided into plural logical sectors and the host allocates space within the clusters comprising of a plurality of logical sectors. A cluster is a subdivision of logical addresses and a cluster map is designated as a file allocation table ("FAT"). The FAT is normally stored on a storage device itself.

In conventional systems, when writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

Other file storage systems (or formats) are being developed so that a host does not have to perform the file to logical address mapping. However, these new file systems may still have to be used with legacy host systems to read data.

Therefore, there is a need for a method and system that allows a host system to efficiently access files in a flash device that uses a non-traditional file storage format.

SUMMARY OF THE INVENTION

In one aspect of the present invention, a system for reading data from a non-volatile mass storage device is provided. The system includes a file storage segment that reads and writes data on a file-by-file basis, allowing a host system to access data from the non-volatile mass storage device using a file based protocol; and a logical interface segment that allows the host system to access data using logical addressing, wherein the host system is unaware of a storage format under which data is stored on a file-by-file basis.

In another aspect, a method for reading data from a non-volatile mass storage device that stores data on a file-by-file basis is provided. The method includes, performing logical configuration for the non-volatile mass storage device, wherein file data is allocated addresses in a virtual logical address space; and data identified by virtual logical addresses is read by a host system.

In yet another aspect of the present invention, a method for reading data from a non-volatile mass storage device is provided. The method includes, performing logical configuration for the non-volatile mass storage device that stores file data on a file-by-file basis, wherein during the logical configuration a logical index is created where the logical index includes an entry for each file that is identified in a file directory and each entry specifies an address for a file within a virtual logical address space for the non-volatile mass storage device and a corresponding entry location in the file directory;

and operating the non-volatile mass storage device wherein data identified by the virtual logical address is read by the host system.

In yet another aspect of the present invention, a system for reading data in a non-volatile mass storage device is provided. The system includes, a direct data file storage segment that operates in a direct data file access mode allowing a host system to access data from the non-volatile mass storage device on a file-by-file basis; and a logical interface segment that allows the host system to access data using logical addressing, wherein the host system is unaware of a storage format under which data is stored on a file-by-file basis.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B shows a block diagram of a flash device controller, used according to one aspect of the present invention;

FIG. 2D shows a block diagram of a logical index table, used according to one aspect of the present invention;

DETAILED DESCRIPTION OF THE PREFERRED EMBODIMENTS

To facilitate an understanding of the preferred embodiment, the general architecture and operation of a host system/non-volatile mass storage system will be described. The specific architecture and operation of the preferred embodiment will then be described with reference to the general architecture.

Figure 1A:
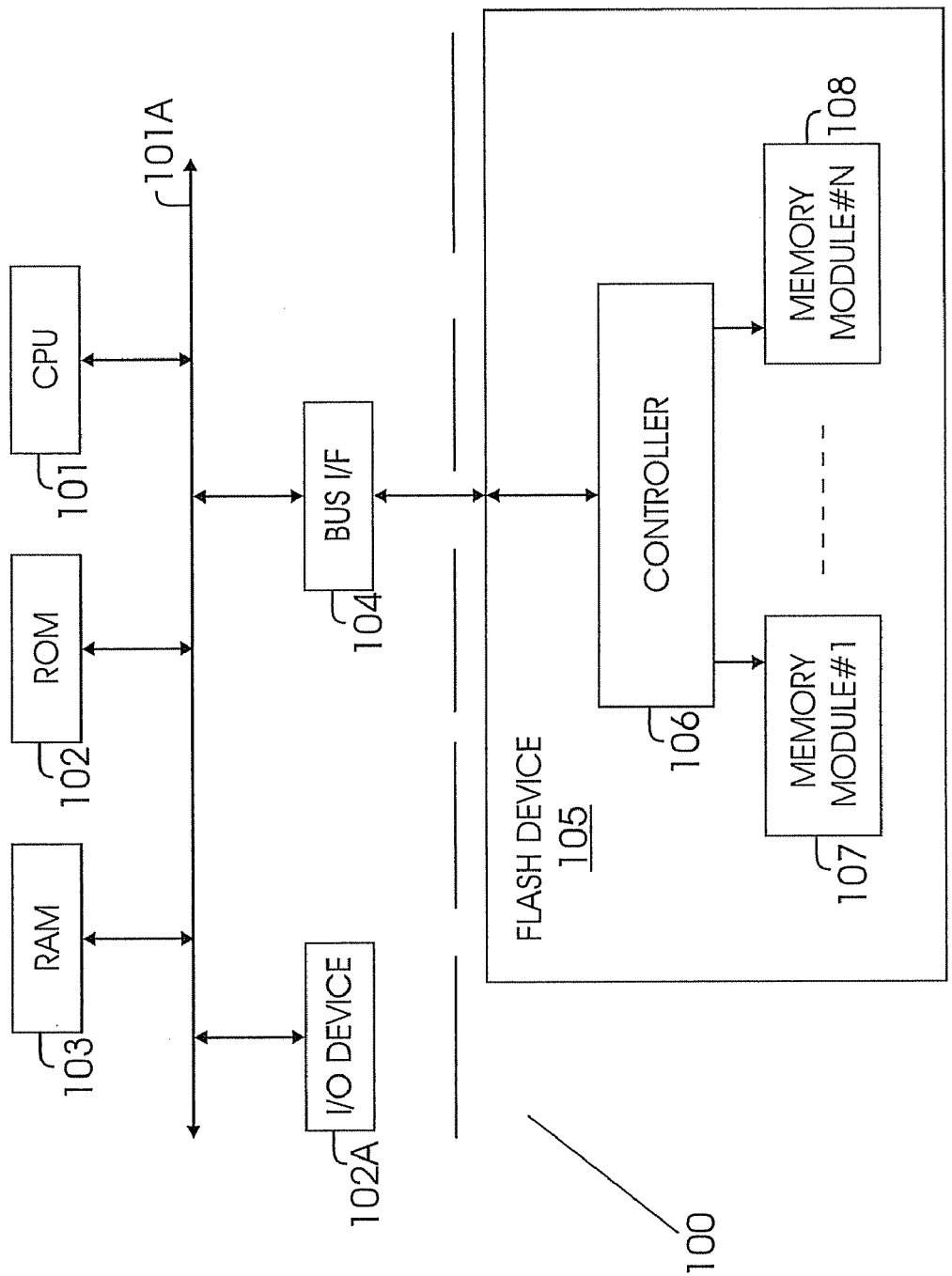
FIG. 1A shows a block diagram of a host system using a flash device.

Host System/Memory System:

FIG. 1A shows a block diagram of a typical host system 100 that includes a central processing unit ("CPU") (or microprocessor) 101 connected to a system bus 101A. Random access main memory ("RAM") 103 is also coupled to system bus 101A and provides CPU 101 with access to memory storage. When executing program instructions, CPU 101 stores those process steps in RAM 103 and executes the stored process steps out of RAM 103.

Read only memory (ROM") 102 is provided to store invariant instruction sequences such as start-up instruction sequences or basic Input/output operating system (BIOS) sequences.

Input/Output ("I/O") devices 102A, for example, a keyboard, a pointing device ("mouse"), a monitor, a modem and the like are also provided.

Mass storage device (Flash device) 105 also provides non-volatile memory for CPU 101. Flash device 105 includes a controller module 106 (may also be referred to as "memory system controller") and solid state memory modules 107-108 (shown as Memory Module #1 and Memory Module #N). Controller module 106 interfaces with host system 100 via a bus interface 104 or directly via system bus 101A or another peripheral bus (not shown).

There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

It is noteworthy that the adaptive aspects of the present invention are not limited to a flash device 105, and can be used for any non-volatile mass storage system.

FIG. 1B shows a block diagram of the internal architecture of controller module 106. Controller module 106 includes a microcontroller 109 that interfaces with various other components via interface logic 111. Memory 110 stores firmware and software instructions that are used by microcontroller 109 to control the operation of flash device 105. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 113 interfaces with host system 100, while a flash interface 112 interfaces with memory modules 107-108.

Figure 1C:
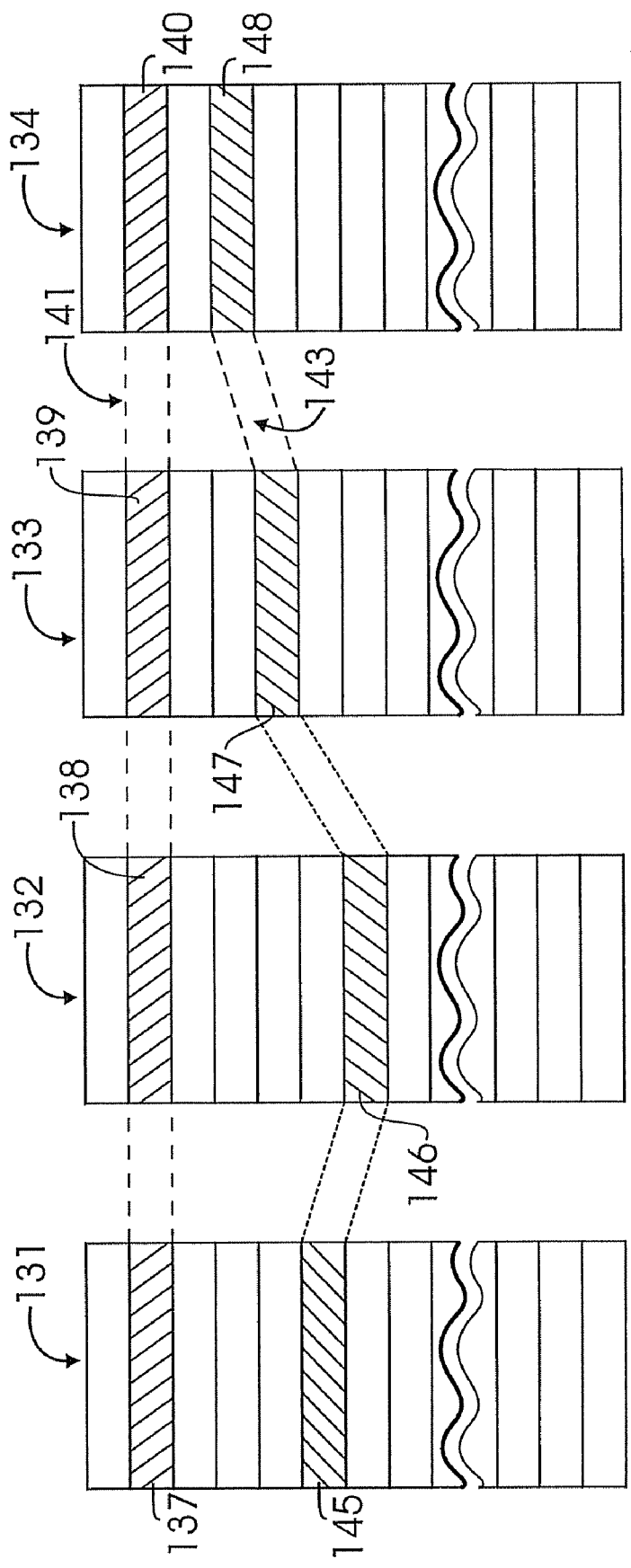
FIG. 1C shows an example of physical memory organization for a flash memory system.

FIG. 1C conceptually illustrates an organization of the flash memory cell array (107-108) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 1C by rectangles, such as blocks 137, 138, 139 and 140, located in respective planes 131-134. There can be dozens or hundreds of blocks in each plane.

A block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148.

Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 1D:
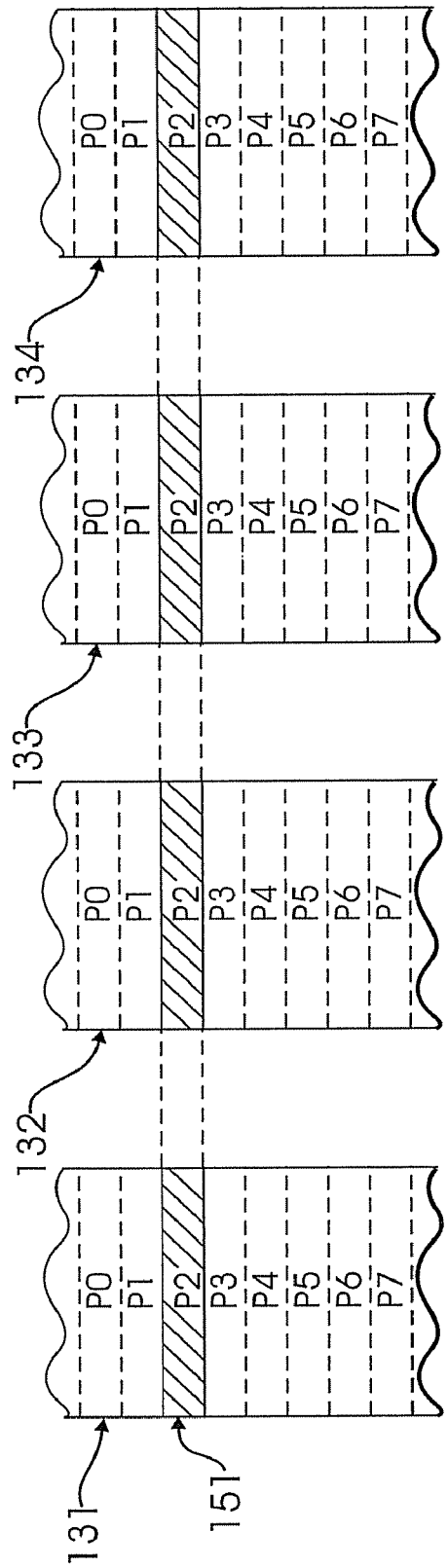
FIG. 1D shows an expanded view of a portion of the physical memory of FIG. 1C.

The individual blocks are in turn divided for operational purposes into pages of memory cells, as illustrated in FIG. 1D. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time. In the NAND architecture, a page is formed of memory cells along a word line within a block. However, in order to increase the memory system operational parallelism, such pages within two or more blocks may be logically linked into metapages. A metapage 151 is illustrated in FIG. 1D, being formed of one physical page from each of the four blocks 131-134. The metapage 151, for example, includes the page P2 in each of the four blocks but the pages of a metapage need not necessarily have the same relative position within each of the blocks.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 1D, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

Figure 1E:
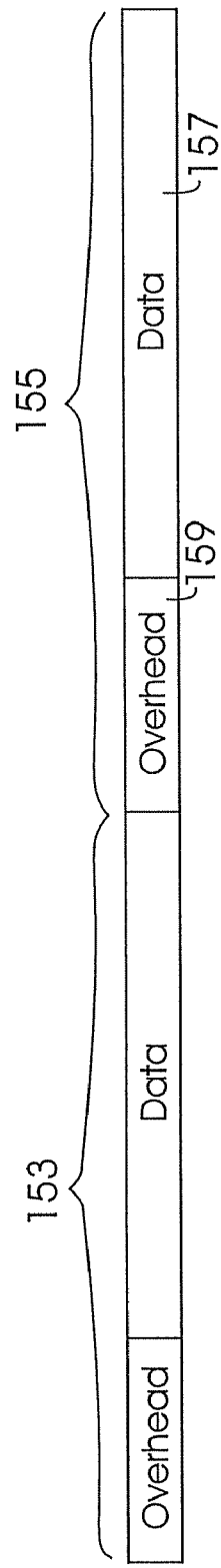
FIG. 1E shows a further expanded view of a portion of the physical memory of FIGS. 1C and 1D.

FIG. 1E shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage.

The physically small re-programmable non-volatile memory cards and flash drives identified above are commercially available with data storage capacity of 512 megabytes (MB), 1 gigabyte (GB), 2 GB and 4 GB, and may go higher.

Figure 1F:
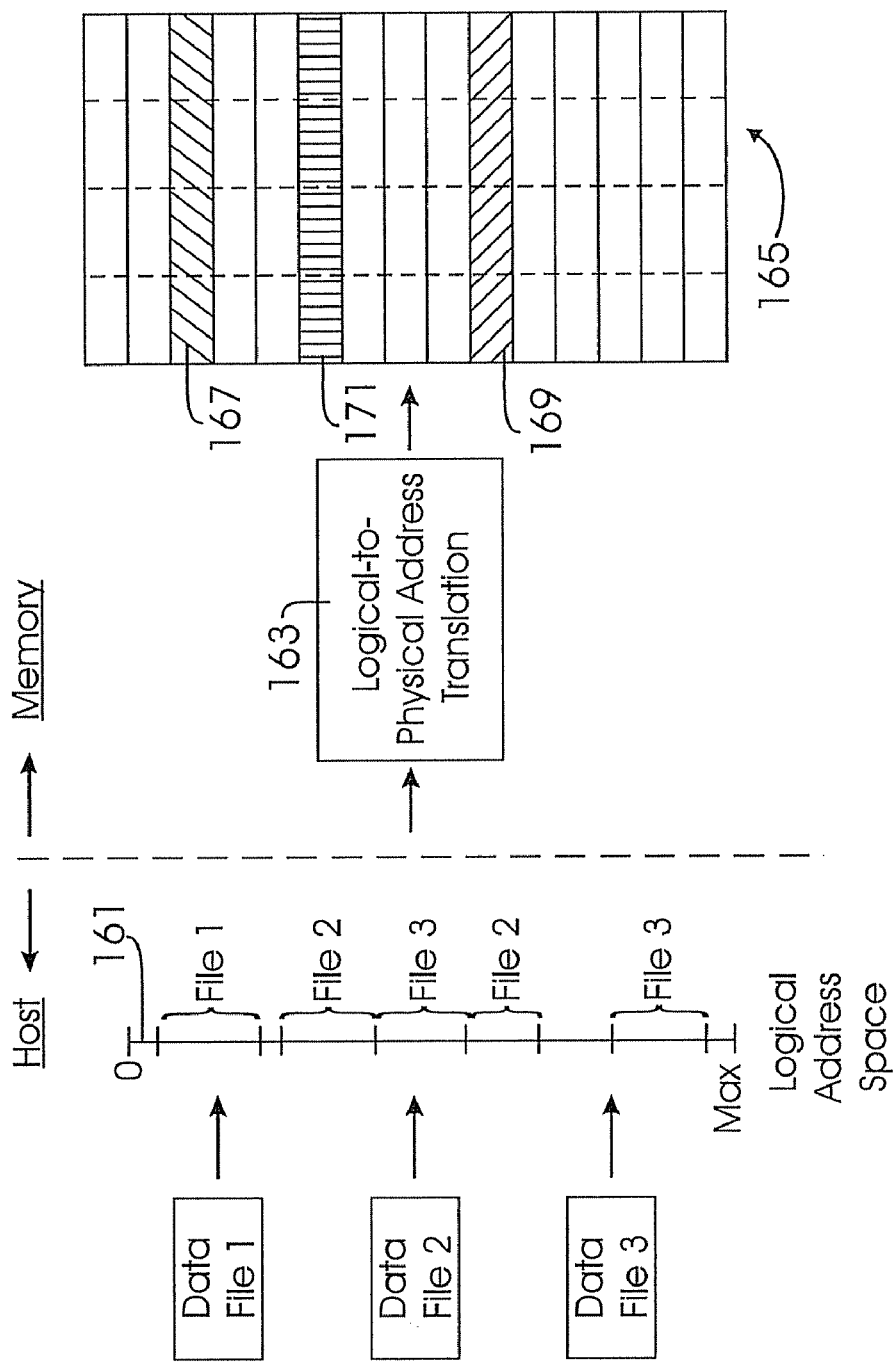
FIG. 1F shows a conventional logical address interface between a host and a re-programmable memory system.

FIG. 1F illustrates the most common interface between a host and such a mass memory system. The host deals with data files generated or used by application software or firmware programs executed by the host. A word processing data file is an example, and a drawing file of computer aided design (CAD) software is another, found mainly in general computer hosts such as PCs, laptop computers and the like. A document in the pdf format is also such a file. A still digital video camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

A common logical interface between the host and the memory system is illustrated in FIG. 1F. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Files 1, 2 and 3 are shown in the example of FIG. 1C to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 1F. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 and other data.

The host keeps track of the memory logical address space by maintaining a file allocation table (FAT), where the logical addresses the host assigns to the various host files are maintained. The FAT table is typically stored in the non-volatile memory, as well as in a host memory, and is frequently updated by the host as new files are stored, other files deleted, files modified and the like. When a host file is deleted, for example, the host then de-allocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through a typical host/card interface, only knows the portions of the logical address space to which data have been written but does not know the logical addresses allocated to specific host files, or even the number of host files. The memory system controller 106 converts the logical addresses provided by the host for the storage or retrieval of data into unique physical addresses within the flash memory cell array where host data are stored. A block 163 represents a working table of these logical-to-physical address conversions, which is maintained by the memory system controller 106.

The memory system controller 106 is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files.

The memory system controller 106 does not know, however, how the data received has been allocated by the host among its various file objects. All the memory controller 106 typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool.

When the host writes data to the memory system, the controller 106 converts the logical addresses assigned by the host to physical addresses within a metablock in the erased block pool. Other metablocks not being used to store data within the logical address space 161 are then erased and designated as erased pool blocks for use during a subsequent data write operation.

Data stored at specific host logical addresses are frequently overwritten by new data as the original stored data become obsolete. The memory system controller 106, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller 106 typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller 106 normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Figure 2A:
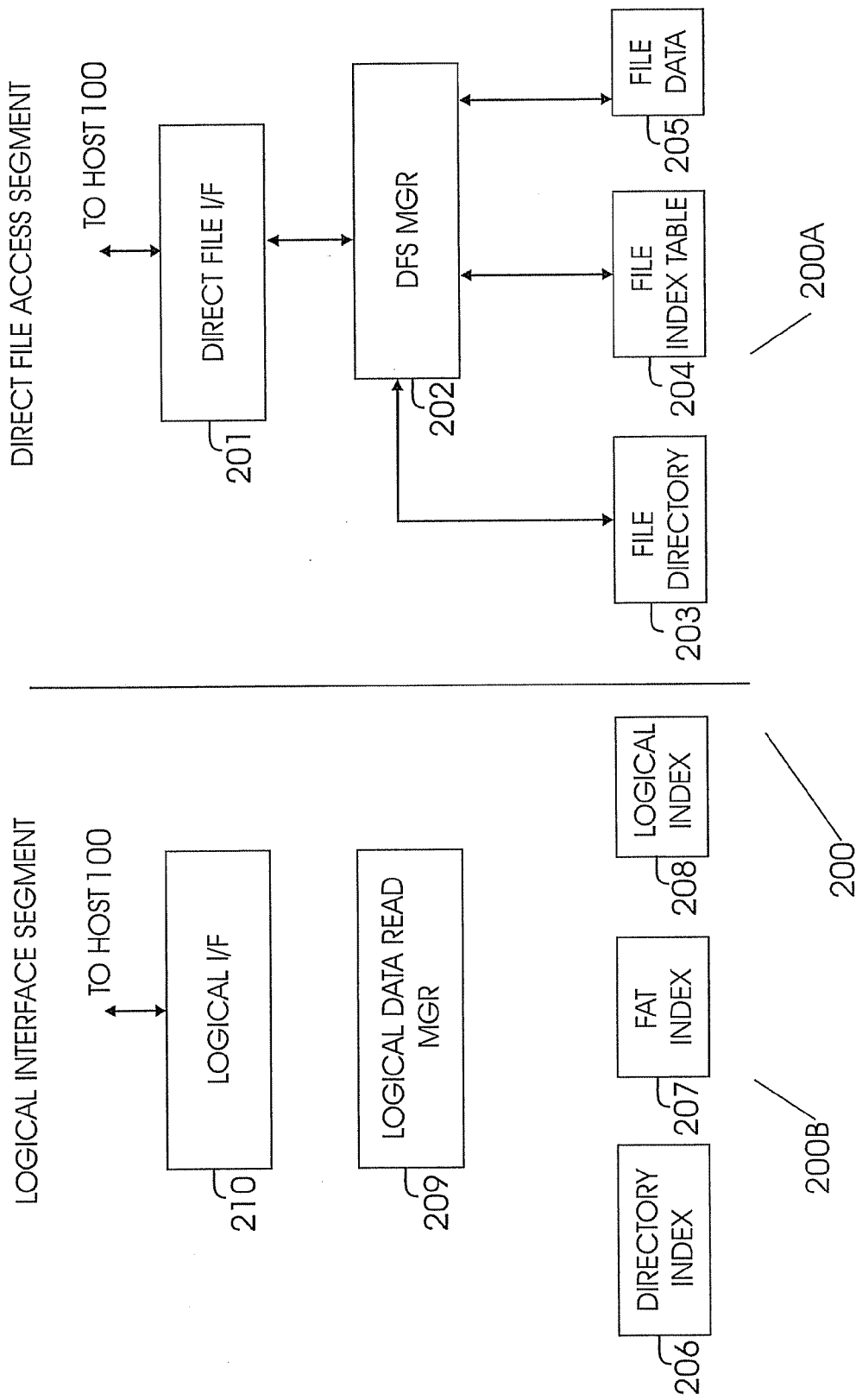
FIG. 2A shows a top-level logical block diagram of a system used by a flash device, according to one aspect of the present invention.

Direct Data File Storage:

FIG. 2A shows a block diagram of system 200 used by flash device 105 for a direct data file storage ("DFS") methodology/system disclosed in co-pending patent application Ser. No. 11/060,249; Filed on Feb. 16, 2005; Attorney Docket Number SDK0380.US0, entitled "Direct Data File Storage in Flash Memories" and in the Direct Data File Storage Applications referenced above.

In a DFS device, data is accessed by host system 100 on a file-by-file basis (a file based protocol) as described in the aforementioned patent application, that is, data is identified by a file identifier and an offset address within the file. No logical address space is defined for the device. Host system 100 does not allocate file data to logical clusters, and directory/index table information for files is generated by flash device 105.

The host addresses each file by a unique file ID (or other unique reference) and offset addresses of units of data (such as bytes) within the file. This file address is given directly to the memory system controller 106, which then keeps its own table of where the data of each host file are physically stored.

Figure 1G:
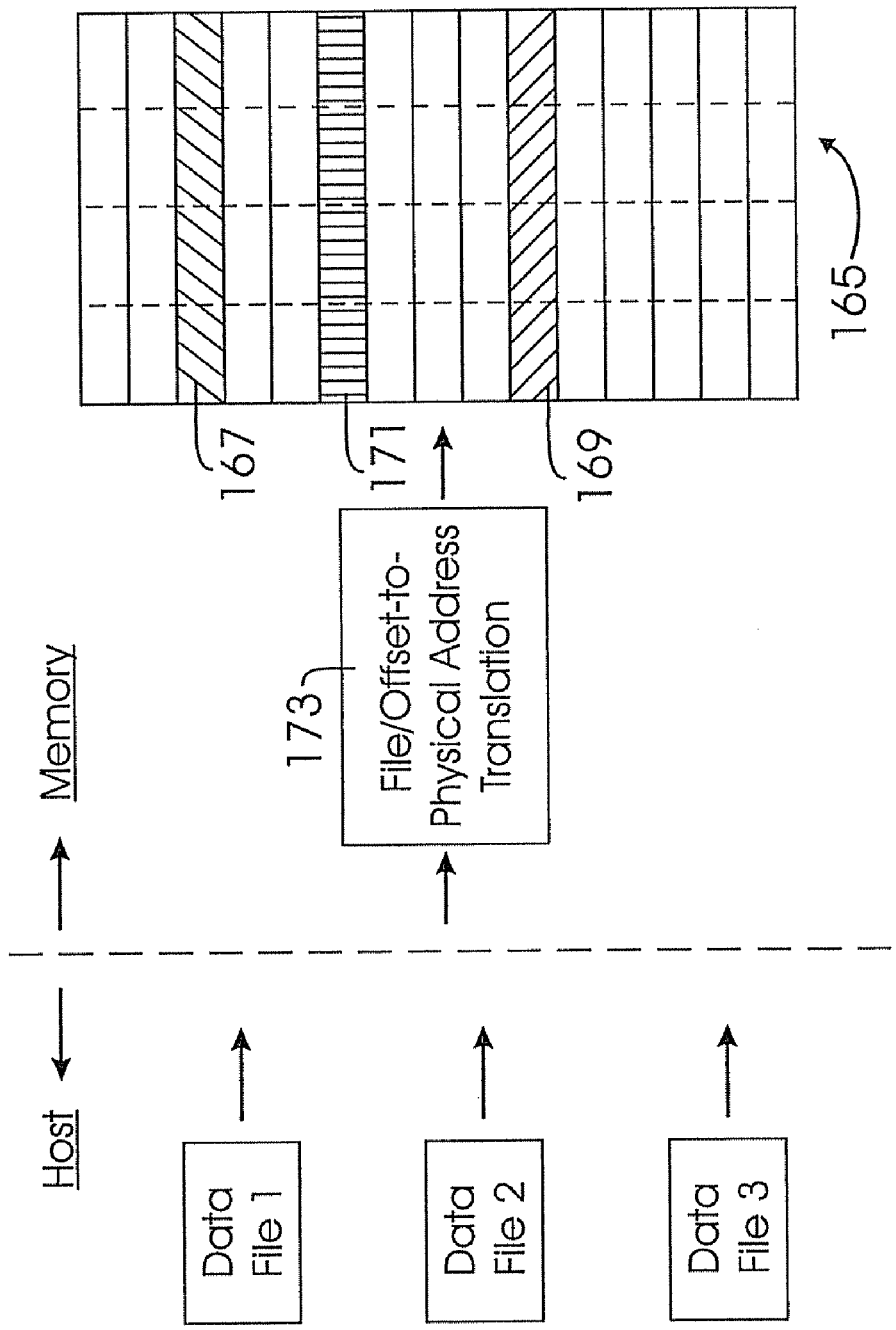
FIG. 1G shows a direct data file storage interface between a host and a re-programmable memory system, according to one aspect of the present invention.

This file-based interface is illustrated in FIG. 1G, which should be compared with the logical address interface of FIG. 1F. An identification of each of the Files 1, 2 and 3 and offsets of data within the files of FIG. 1G are passed directly to the memory controller. This logical address information is then translated by a memory controller function 173 into physical addresses of metablocks and metapages of the memory 165.

Figures 1H, 1L:
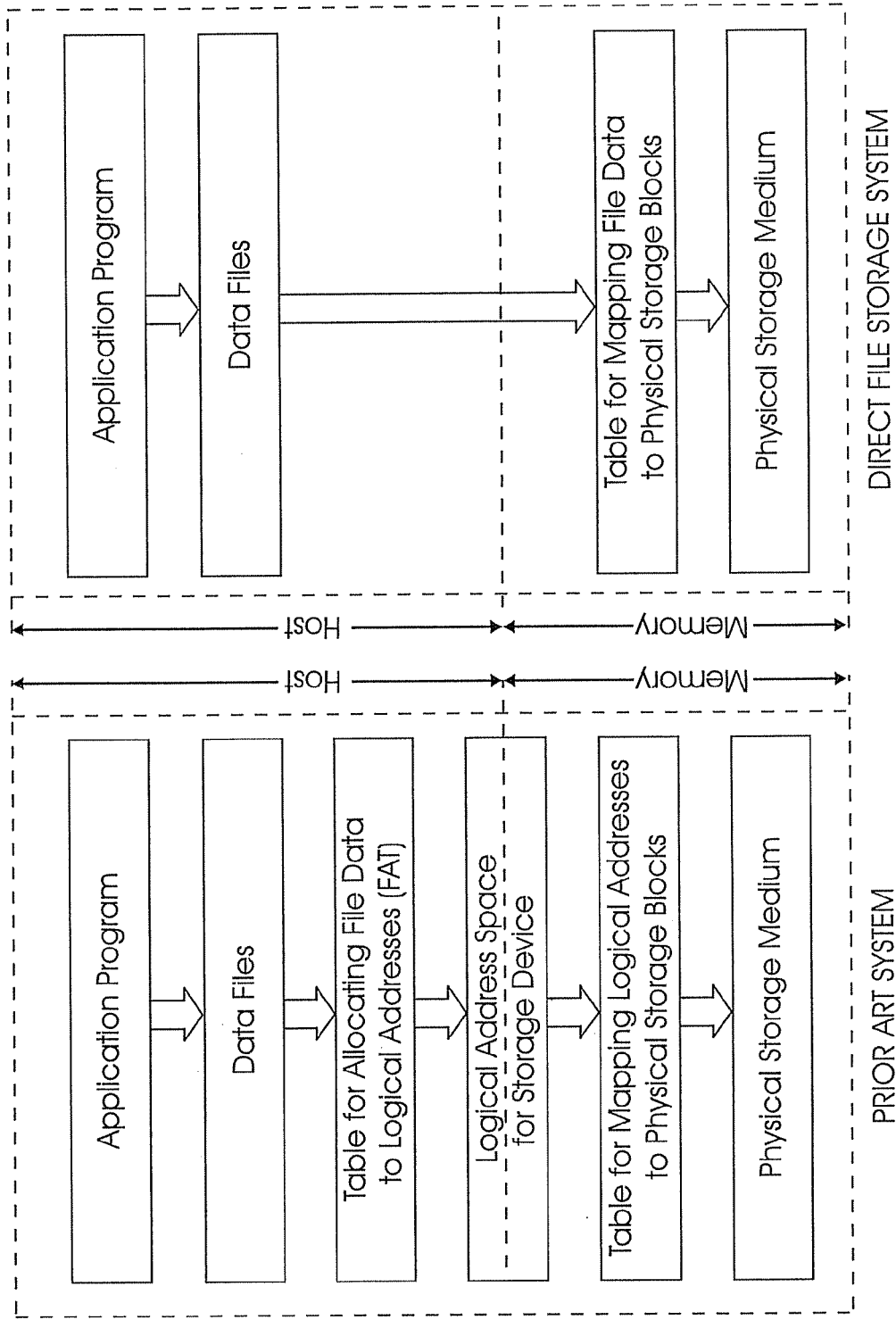
FIG. 1H shows in a different manner than FIG. 1F a conventional logical address interface between a host and a re-programmable memory system.
FIG. 1L shows in a different manner than FIG. 1G, a direct data file storage interface between a host and a re-programmable memory system, according to one aspect of the present invention.

The file-based interface is also illustrated by FIG. 1L, which should be compared with the logical address interface of FIG. 1H. The logical address space and host maintained FAT table of FIG. 1H are not present in FIG. 1L. Rather, data files generated by the host are identified to the memory system by file number and offsets of data within the file. The memory system then directly maps the files to the physical blocks of the memory cell array.

Figure 1M:
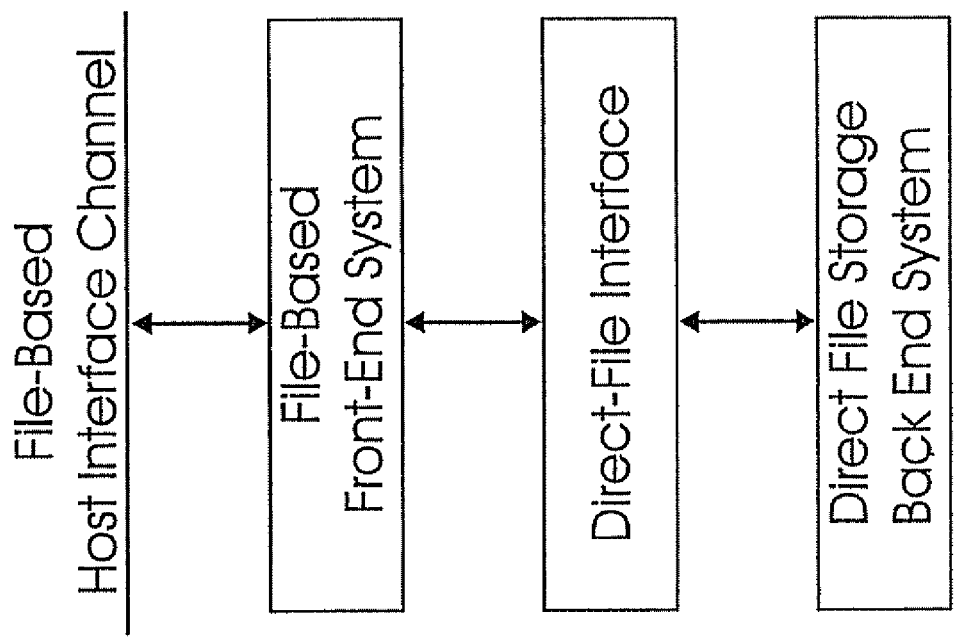
FIG. 1M shows a functional hierarchy of an example memory system.

With reference to FIG. 1M, functional layers of an example mass storage system being described herein are illustrated. The "Direct Data File Storage Back End System" communicates through a "Direct Data File Interface" and a "File-Based Front-End System" with a host system over a file-based interface channel. Each host file is uniquely identified, such as by a file name. Data within a file are identified by an offset address within a linear address space that is unique to the file.

Although DFS devices will be used advantageously by host systems, there are still and will be legacy host systems that need to use a logical interface to read data files. In one aspect of the present invention, a DFS device can be accessed in a read-only mode by legacy host systems. When flash device 105 detects that it has been inserted in a conventional host system, it emulates directory and FAT data structures according to the DOS standards, and represents file data address as contiguous regions of a virtual logical address space. The legacy host system interfaces with DFS enabled flash device 105 as if was a conventional flash device with a logical interface.

In another embodiment of the present invention, a host system may wish to access the flash device 105 using both a file-based interface and a logical interface. For example, legacy application software on a host may use a logical interface for compatibility with legacy memory devices operating only with the logical interface, whilst other applications may use a file based interface to a DFS device.

Referring back to FIG. 2A, system 200 emulates a logical sector interface by creating directory and FAT information to represent files stored in flash device 105 as unfragmented data in a virtual logical address space. System 200 includes a DFS segment 200A and a logical segment 200B. Logical segment 200B is enabled when flash device 105 detects that it is being used with a legacy host that uses a logical interface for reading data.

Segments 200A and 200B are described below with respect to the various modes of operation for flash device 105.

Direct Data File Access Mode (or "DFS Mode"): During the DFS mode, flash device 105 operates in a direct data file access mode that is described in detail in the aforementioned co-pending patent application. During this mode, a host system sends a file identifier and an offset address to direct data file interface 201. No logical address space is required during this mode. File directory 203 and a file index table (may also be referred to as "FIT") 204 are generated by flash device 105.

File directory 203 records file attribute information with a pointer to a first data group entry in the file index table 204. File index table 204 contains an entry for each valid data group within a file with contiguous file offset addresses. Entries for a data group include a file offset address and a physical address.

Figure 2B:
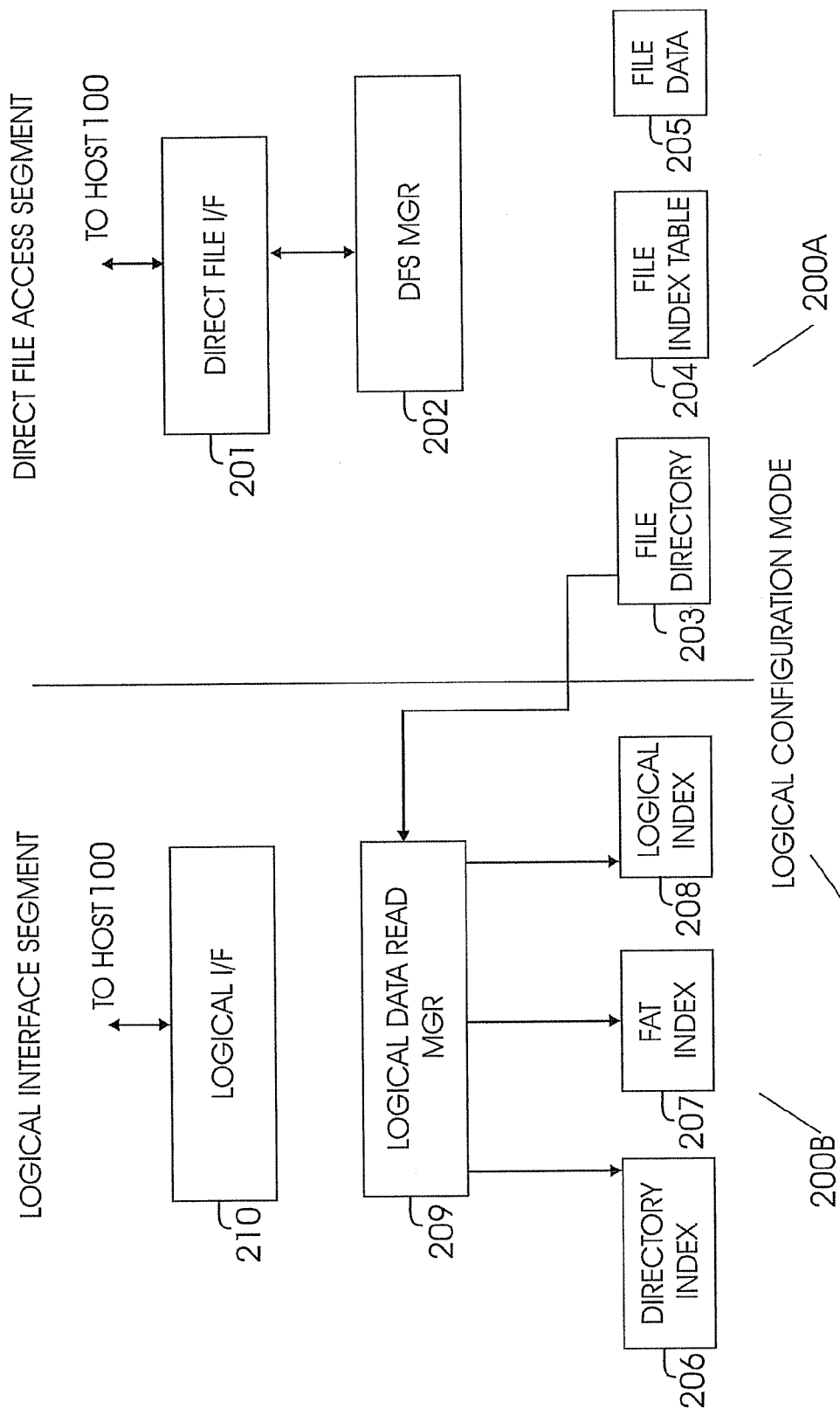
FIG. 2B shows the interconnection between plural components of the system in FIG. 2A for a logical configuration mode, according to one aspect of the present invention.
Figure 2C:
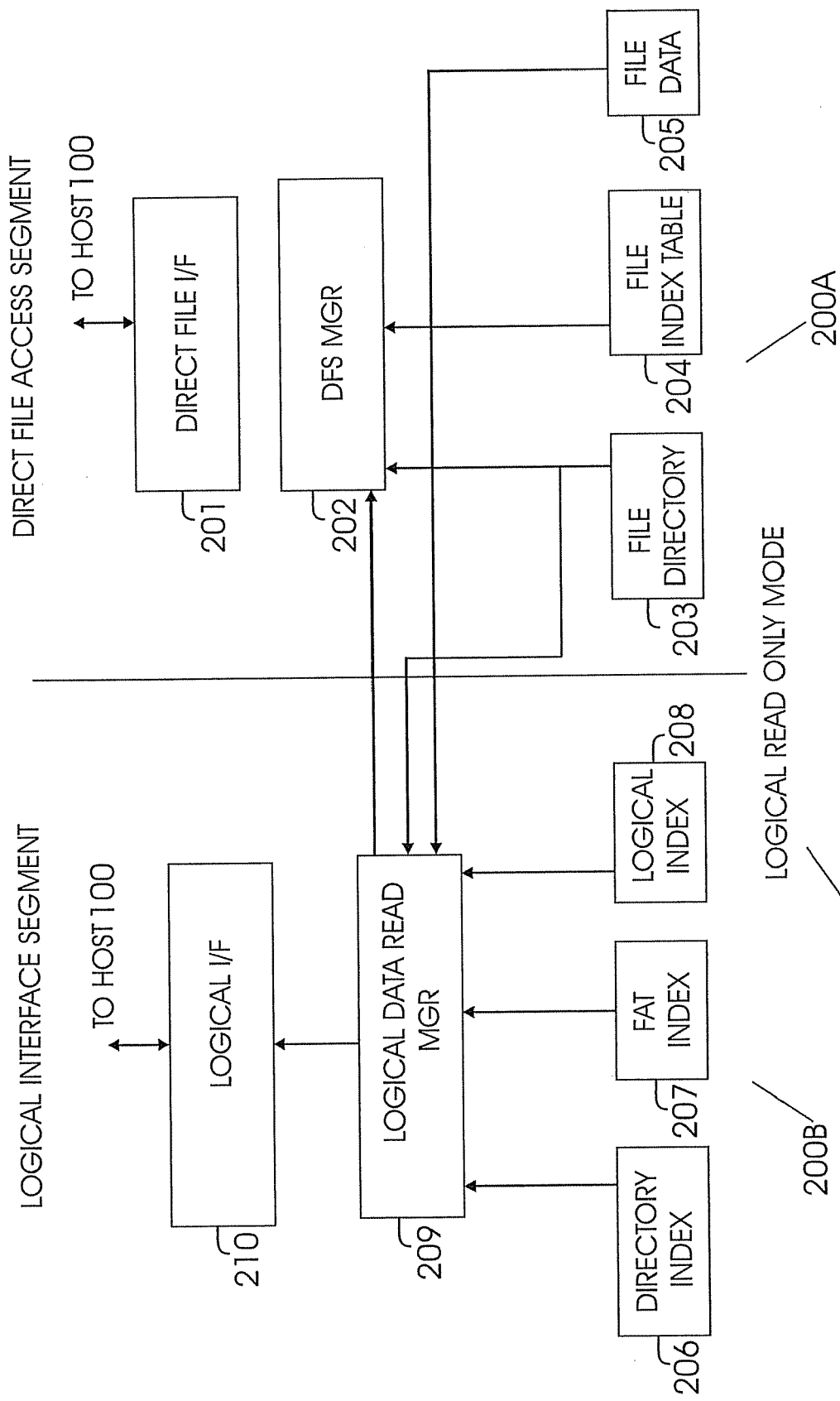
FIG. 2C shows the interconnection between plural components of the system in FIG. 2A for a logical read-only mode, according to one aspect of the present invention.
Figure 2E:
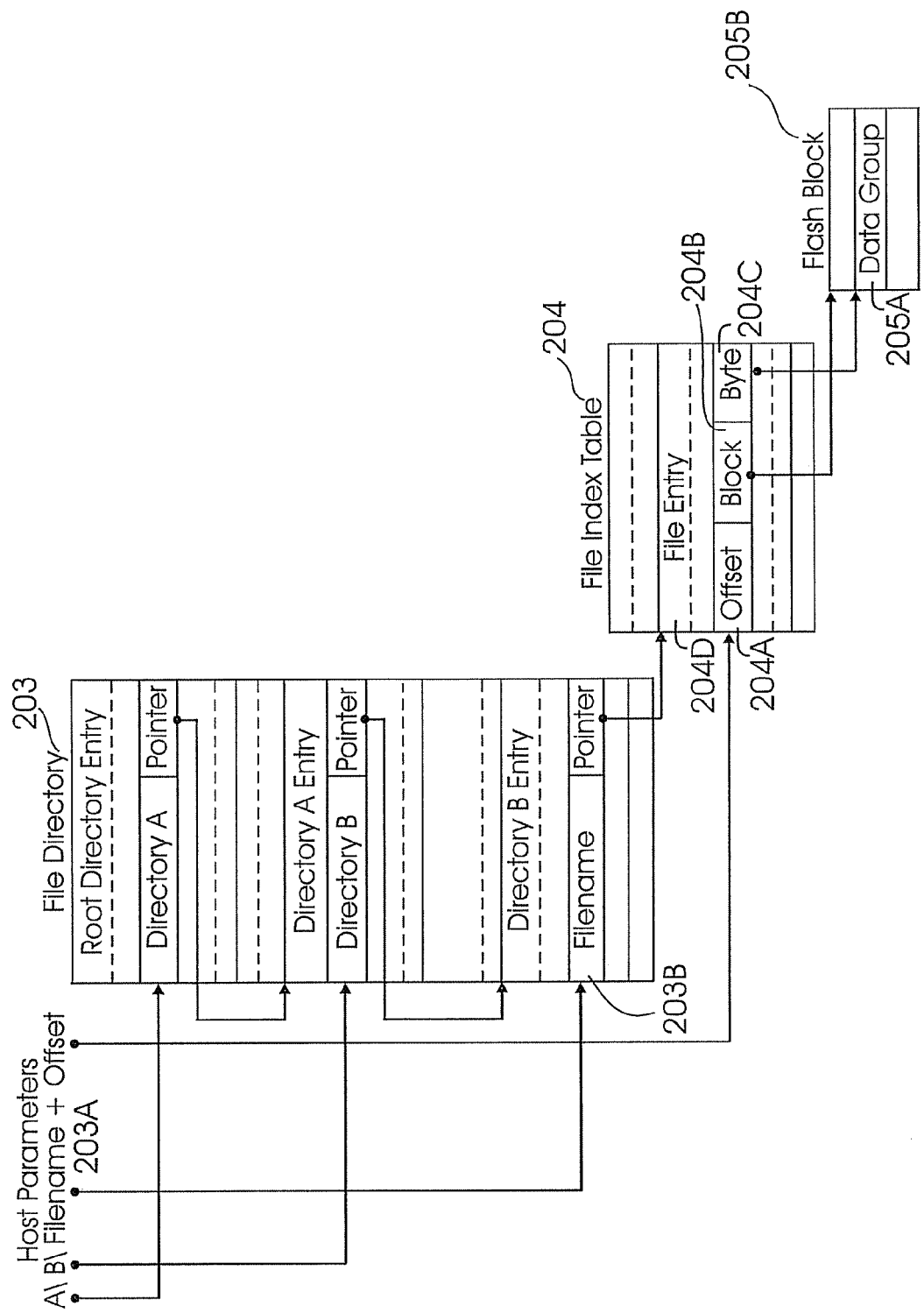
FIG. 2E shows an indexing scheme of a direct data file storage system, according to one aspect of the present invention.

FIG. 2E shows a block diagram of an indexing scheme of a direct data file storage system used according to one aspect of the present invention. Host 100 provides a path, filename and offset 203A to flash device 105. The path points to file directory 203 that stores the directory information, for example, Directory A and B.

Every file in a directory points to an entry in FIT 204 (for example, 203B points to 204D). FIT 204 includes an entry for every data group and each entry (for example, 204D) includes an offset value 204A, block value 204B and byte value 204C. The offset value 204A shows offset address within the file corresponding to the start of a data group (for example, 205A in flash block 205B). The block value 204B provides the actual physical address of the data block and the byte value 204C points to a byte where the data group begins.

Logical Configuration Mode:

When flash device 105 detects that it is inserted in a legacy host system (or communicates with a legacy host system/ operationally coupled with a legacy host system) that needs a logical interface to read data, a logical configuration operation is performed, according to one aspect of the present invention.

A logical configuration may also be performed at other times, such as may be determined by controller 106 or in response to a command received at the host interface 113.

As shown in FIG. 2B, during logical configuration operation the contents of file directory 203 are used to create a directory index 206, a FAT index 207 and a logical index 208 to respond to logical interface 210 that is coupled with host system 100. File directory 203 is scanned by a logical data read manager 209 and the information is used to create the aforementioned index tables.

Directory Index 206: Directory index 206 includes a virtual logical address that is assigned for each file directory 203 entry. A file directory 203 entry defines a sub-directory or a file and contains a pointer to the file directory 203 or FIT 204.

It is noteworthy that pointers in a DOS directory relate to logical addresses in the address space of the device. Directory index 206 contains virtual logical addresses that are used to substitute for the pointers in file directory 203, to create a directory conforming to DOS standards FAT Index 207: FAT index 207 contains information that allows a FAT to be emulated for the virtual address space for the flash device 105 (see FIG. 2F). Files in flash device 105 are emulated as occupying contiguous set of logical sequential clusters. A FAT contains one entry for each emulated cluster in the virtual logical address space for flash device 105. The emulated clusters allocated to data for a file have FAT entries that point to a following cluster, except the last cluster that includes an <End of File> code.

It is noteworthy that the present invention is not limited to explicitly storing such FAT entries as they can be generated algorithmically when a FAT sector is read by a host. A record that identifies FAT entries with an <End of File> code is stored. For each sector of FAT entries (207A). FAT index 207 contains a list of entries that contain an <End of File> code (see FIG. 2F).

Logical Index 208: During logical read-only mode, file data from flash device 105 is accessed by using a logical address. Logical index 208 is used to convert a logical address to a File Directory 203 entry address and a file address offset so that file data 205C (FIG. 2D) may be read by a legacy host (or any other host system). Logical index 208 includes one entry for each file that is identified in File Directory 203. Each logical index 208 entry specifies an address in the virtual logical address space and the relevant entry location in the File Directory 203.

FIG. 2D illustrates the logical index table 208, according to one aspect of the present invention. An entry in the logical index 208 includes two fields. X and Y. Field Y is the logical address assigned to the beginning of the file with an entry at location X in the file directory. The emulated logical address map is shown as 208A, while 208B shows how file entry X points to a FIT table 204 entry.

A host provides a target logical address Y' (not shown), and the logical index 208 is searched to find logical address Y for the beginning of the file within which logical address Y' is located. (Y'-Y) defines the offset address of the target logical address within the file. Logical index 208 provides location X corresponding to logical address Y. This allows file data 205 to be provided to a legacy host using a logical interface.

Figure 2G:
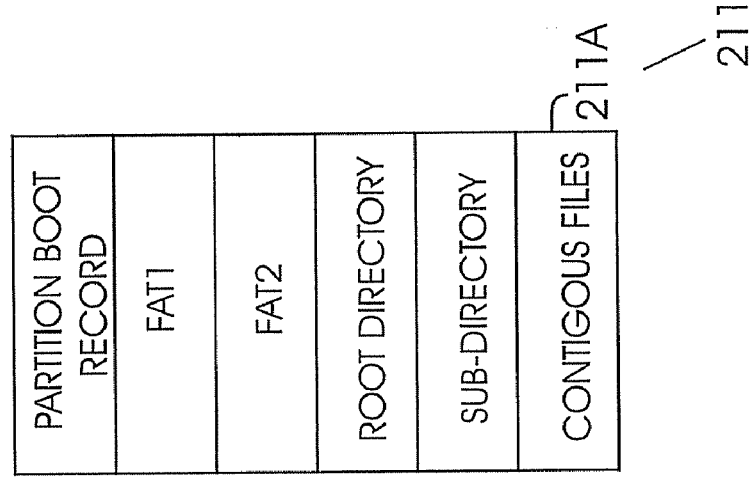
FIG. 2G shows a block diagram of a logical address map, according to one aspect of the present invention.

FIG. 2G shows a virtual logical address space 211 for flash device 105, within which data structures are represented. According to the DOS standards, FAT 1, FAT2 and Root directory structures are represented by a set of logical addresses following the partition boot record. In conventional systems, clustered data space begins after the root directory.

Flash device 105 represents sub-directories as being at successive cluster addresses at the beginning of a data space. Files are represented as occupying sequential clusters in data space without fragmentation of address and without unallocated clusters between the files (shown as contiguous files 211A).

Logical Read Only Mode:

When flash device 105 is configured for logical read-only operation, it may be read using logical interface 210 as shown in FIG. 2C. A host sector address is recognized as relating to a directory sector. FAT sector or data sector based on its range within the virtual logical address space.

Entries relating to a directory sector are read from file directory 203 and are modified by using a corresponding entry from directory index 206, before being returned to a host system.

Figure 2F:
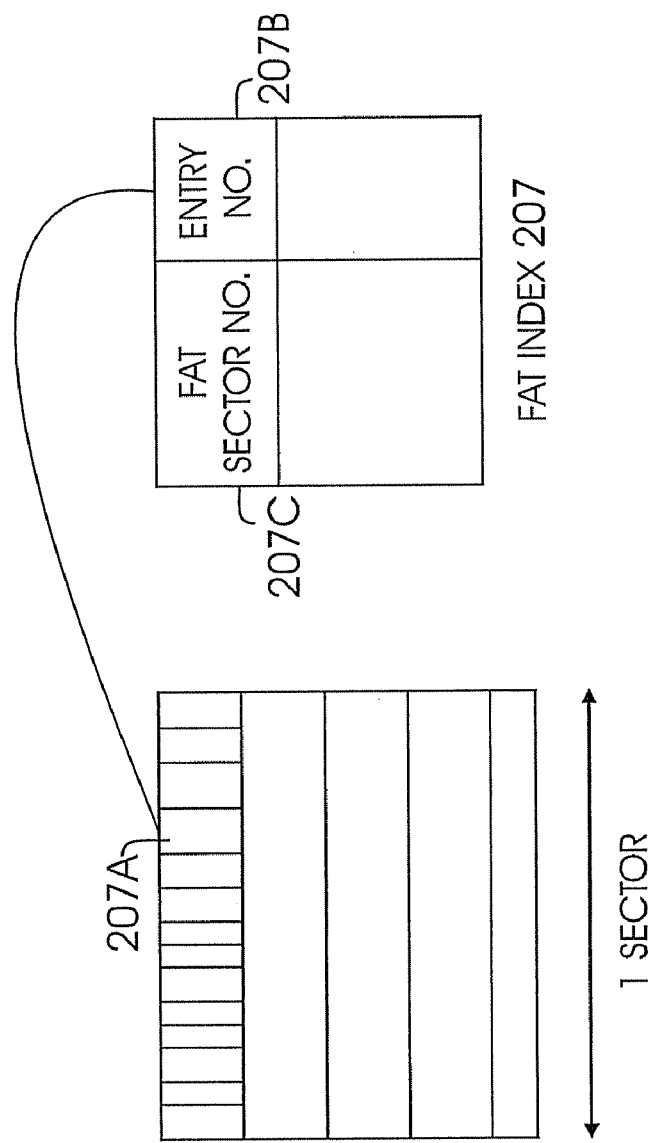
FIG. 2F shows a block diagram of a FAT Index table, used according to one aspect of the present invention.

Entries relating to a FAT sector are created as a set of incrementing cluster addresses, and are updated to <End of File> codes according to entries for the sector in the FAT index 207. Thereafter, the entries are returned to a host system. FIG. 2F shows an example of FAT index 207 in which each entry designates the FAT sector number (207C) and FAT sector entry number (207B) of FAT entries (207A) containing <End of File> code.

A logical sector address from a host system is converted to an entry address in the file directory 203 with a file offset address by searching entries in the logical index 208. Sector data is read using direct data file storage manager 202.

It is noteworthy that memory 110 may be used for storage and access of directory index 206. FAT index 207 and logical index 208. DFS manager 202 may use a pool of buffers in memory 110 and a pool of erased blocks for file and control data storage. These buffers (not shown) are not used during the logical read-only operation and hence may be used to store the foregoing indices. However, the indices may also be stored in flash memory modules 107-108, with or without copies in memory 110.

Figure 3I:
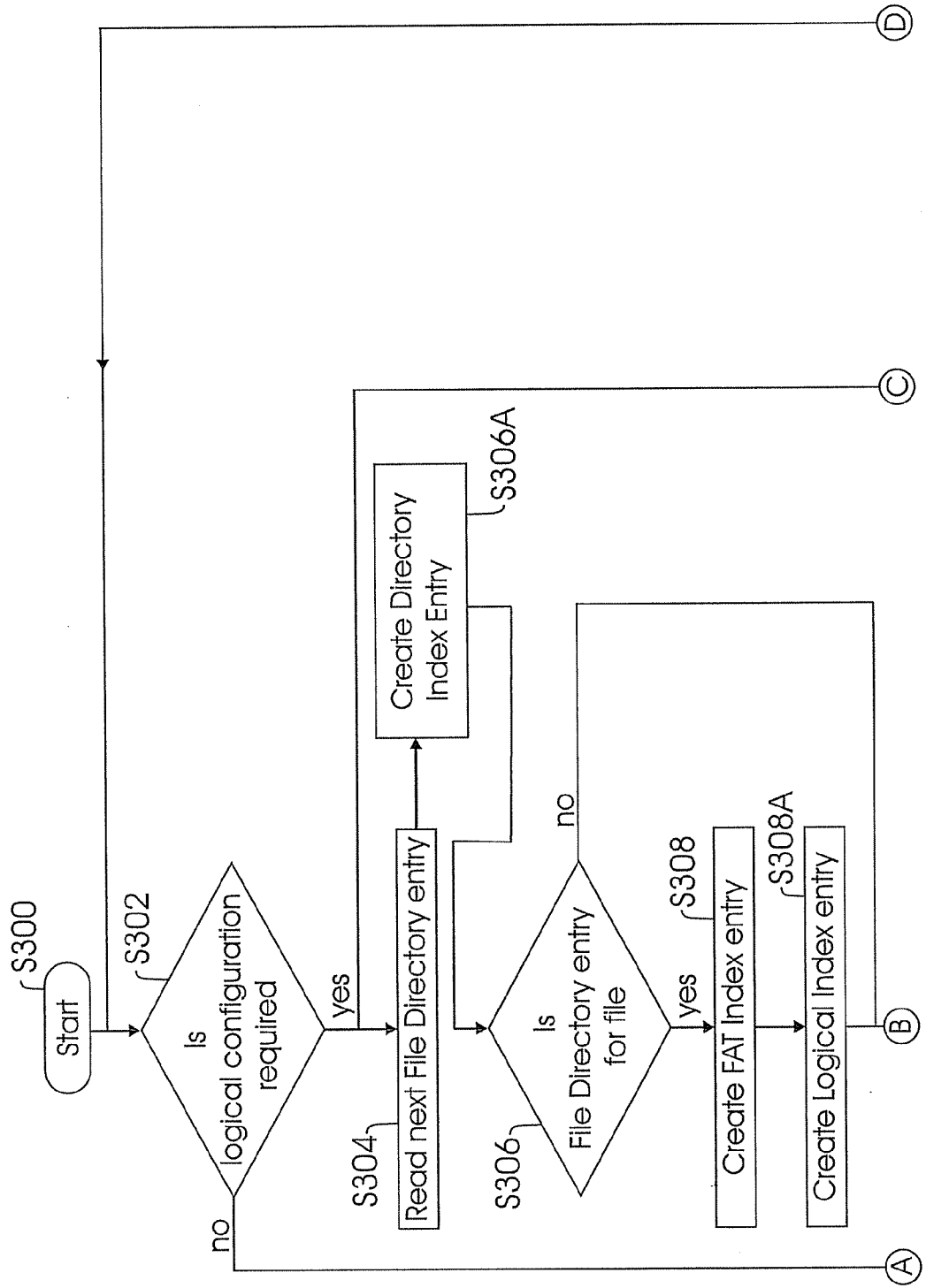
FIG. 3 shows a flow diagram of process steps for reading data from a flash device that stores data on a file-by-file basis, according to one aspect of the present invention.
Figure 3:
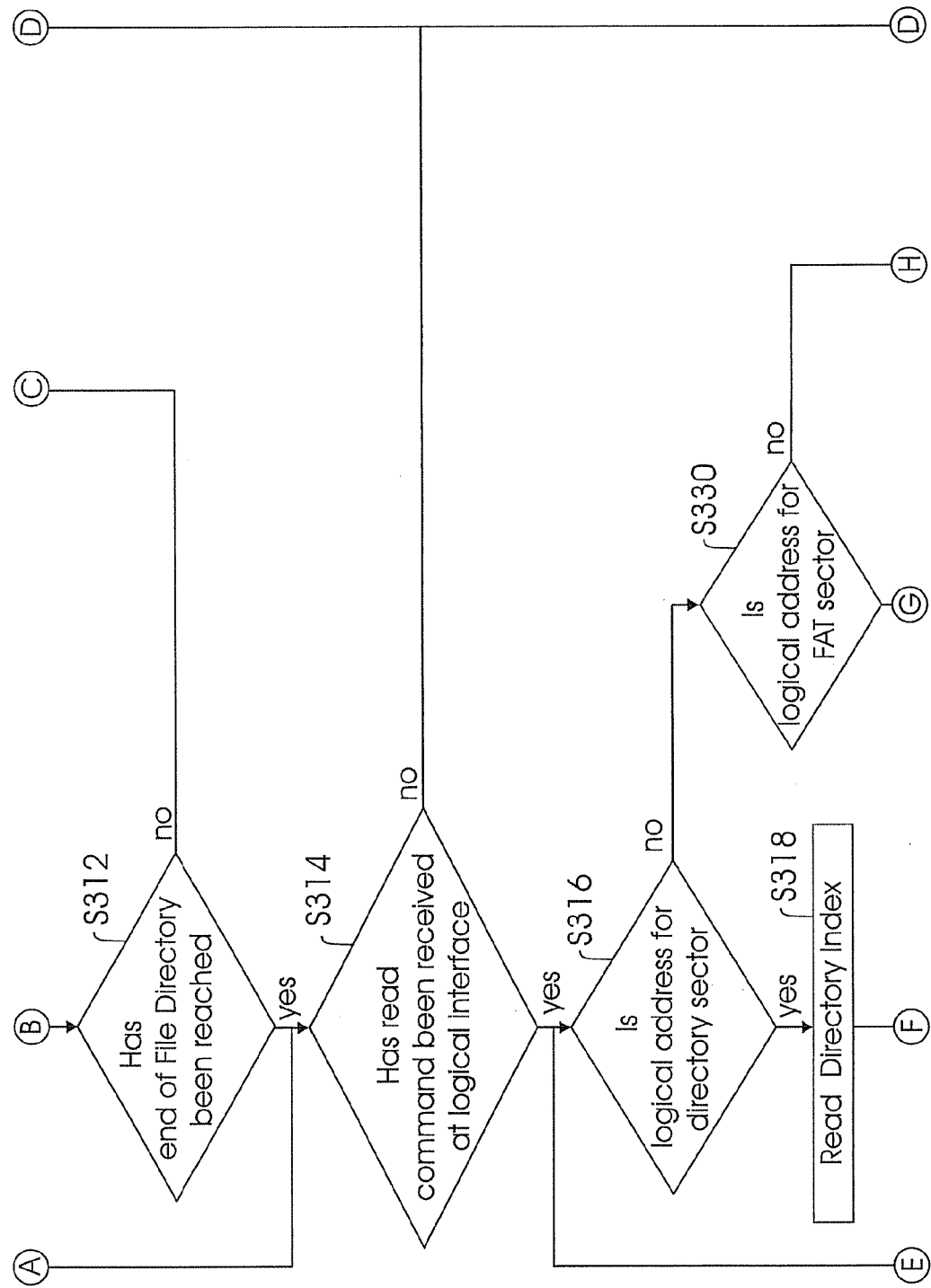

Process Flow:

FIG. 3 shows a flow diagram for reading information from flash device 105, according to one aspect of the present invention. Turning in detail FIG. 3, the process starts in step S300. In step S302, controller 106 determines if logical configuration is required. If no configuration is required, the process moves to step S314, described below in detail.

If logical configuration is required, then in step S304, controller 106 reads the next file directory entry and creates a corresponding entry for directory index 206 in step S306A. Controller 106 then determines in step S306, if the file directory entry is for a file. If the file directory entry is not for a file, then the process moves to step S312 (described below).

If the file directory entry in step S306 is for a file, then in step S308, a FAT index entry 207B is created, and in step S308A, a logical index entry (for example, as shown in FIG. 2D) is created.

In step S312, controller 106 determines if the last entry in the file directory has been reached. If the last entry in the file directory has not been reached, then the process reverts back to step S304. If the last entry in the file directory has been reached, then in step S314, the controller 106 determines if a read command has been received at logical interface 210.

If a read command has not been received, then the process reverts back to step S302.

If the read command has been received, then in step S316, the process determines if the logical address is for a directory sector. If the logical address is for a directory sector, then in step S318 directory index 206 is read and in step S320, the file directory 203 is read. In step S322, a directory sector is created and the information returned to host 100 in step S324.

If in step S316, the logical address is not for a directory sector, then in step S330, the process determines if the logical address is for a FAT sector. If it is for a FAT sector, then in step S332, the FAT index 207 is read. A FAT sector is created in step S334 and returned to host 100 in step S324.

If in step S330, the logical address is not for a FAT sector but for file data, then in step S336, the process determines if the logical address is for file data. If not, then the process reverts back to step S302.

If the logical address is for file data, then in step S338, the logical index 208 is read. The file directory entry is identified in step S340 and data is read from the direct data file storage segment in step S342. Thereafter, file data is returned to host in step S324.

In step S326, the process determines if there are any other logical addresses that are to be read as a result of the read command received in step S314. If not, then the process reverts back to step S302. If there are other logical addresses, then the process reverts back to step S316.

In one aspect of the present invention, a legacy host system does not have to make any upgrades to read data from direct data file storage device.

Although the present invention has been described with reference to specific embodiments, these embodiments are illustrative only and not limiting. Many other applications and embodiments of the present invention will be apparent in light of this disclosure and the following claims.

What is claimed is:

1. A system for reading data in a non-volatile mass storage device, comprising:
   a direct data file storage segment that operates in a direct data file access mode allowing a host system to access data from the non-volatile mass storage device on a file-by-file basis; and
   a logical interface segment that allows the host system to access data using logical addressing, wherein the host system is unaware of a storage format under which data is stored on file-by-file basis, wherein the logical interface includes a directory index, a file allocation table ("FAT") index and a logical index created during a logical configuration mode.

2. The system of claim 1, wherein in the directory index a virtual logical address is assigned to each entry in a file directory.

3. The system of claim 1, wherein the logical index includes an entry for each file that is identified in a file directory and each entry specifies a virtual logical address space and a corresponding entry location in the file directory.

4. The system of claim 1, wherein the FAT index includes a list for each FAT sector and provides an entry number for each FAT sector number.

5. The system of claim 1, wherein during a logical read-only mode, entries relating to a directory sector are read from a file directory and modified by an entry from the directory index.

6. The system of claim 1, wherein during a logical read-only mode, entries relating to a logical sector address from the host system is converted to an entry address in a file directory with a file offset address obtained from entries in the logical index.

7. The system of claim 1, wherein during a logical read only mode, entries relating to a FAT sector are updated based on entries in the FAT index, before being sent to the host system.

8. A system for reading data from a non-volatile mass storage device, comprising:
   a file storage segment that reads and writes data on a file-by-file basis, allowing a host system to access data from the non-volatile mass storage device using a file based protocol; and
   a logical interface segment that allows the host system to access data using logical addressing, wherein the host system is unaware of a storage format under which data is stored on a file-by-file basis, wherein the logical interface segment includes a directory index, a file allocation table ("FAT") index and a logical index created during a logical configuration mode.

9. The system of claim 8, wherein in the directory index, a virtual logical address is assigned to each entry in a file directory.

10. The system of claim 8, wherein the logical index includes an entry for each file that is identified in a file directory and each entry specifies a virtual logical address space and a corresponding entry location in the file directory.

11. The system of claim 8, wherein the FAT index includes a list for each FAT sector and provides an entry number for each FAT sector number.

12. The system of claim 8, wherein entries relating to a directory sector are read from a file directory and modified by an entry from the directory index.

13. The system of claim 8, wherein entries relating to a logical sector address from the host system is converted to an entry address in a file directory with a file offset address obtained from entries in the logical index.

14. The system of claim 8, wherein entries relating to a FAT sector are updated based on entries in the FAT index, before being sent to the host system.

* * * * *